US012659803B2

(12) United States Patent
      Esswie

(10) Patent No.:  US 12,659,803 B2
(45) **Date of Patent:        *Jun. 16, 2026**

(54) PROACTIVE DOWNLINK SCHEDULING VALIDATION

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 224 days.

This patent is subject to a terminal disclaimer.

(21) Appl. No.: 18/434,112

(22) Filed: Feb. 6, 2024

(65) Prior Publication Data

US 2025/0254568 A1     Aug. 7, 2025

(51) Int. Cl.
     H04W 28/10        (2009.01)
     H04W 24/10        (2009.01)

(52) U.S. Cl.
     CPC ........... H04W 28/10 (2013.01); H04W 24/10 (2013.01)

(58) Field of Classification Search
     CPC .............................. H04W 28/10; H04W 24/10
     See application file for complete search history.

(56)                References Cited

U.S. PATENT DOCUMENTS

2020/0274815 A1*   8/2020   Sreevalsan .......... H04L 47/2441
2021/0022034 A1*   1/2021   Zachrison ............. H04W 72/52
2023/0247655 A1*   8/2023   Ly ..................... H04W 72/1268
                                                        370/329
2025/0254544 A1    8/2025   Esswie

OTHER PUBLICATIONS

Office Action mailed Apr. 10, 2026 for U.S. Appl. No. 18/434,099, 26 pages.

* cited by examiner

*Primary Examiner* — Sun Jong Kim
(74) *Attorney, Agent, or Firm* — Amin, Turocy & Watson, LLP

(57)               ABSTRACT

A user equipment may use a learning model to predict user behavior, or traffic corresponding thereto, and may transmit, to a radio network node, a prediction report indicative of the predicted behavior/traffic. Based on the prediction report the node may proactively schedule predicted downlink resources to facilitate delivery, to the user equipment, of predicted downlink traffic that may correspond to the indicated predicted behavior/traffic. The user equipment may indicate that successfully decoded downlink traffic, received from the node according to the scheduled predicted downlink resources, is invalid, or not usable, by avoiding transmission of HARQ feedback corresponding to the received traffic or by transmitting an invalid scheduled resource indication. The user equipment may analyze a confidence level corresponding to the learning model with respect to a confidence level threshold, which may be dynamically increased by the node in response to invalid traffic, to determine whether to transmit a prediction report.

20 Claims, 13 Drawing Sheets

Figure 3:
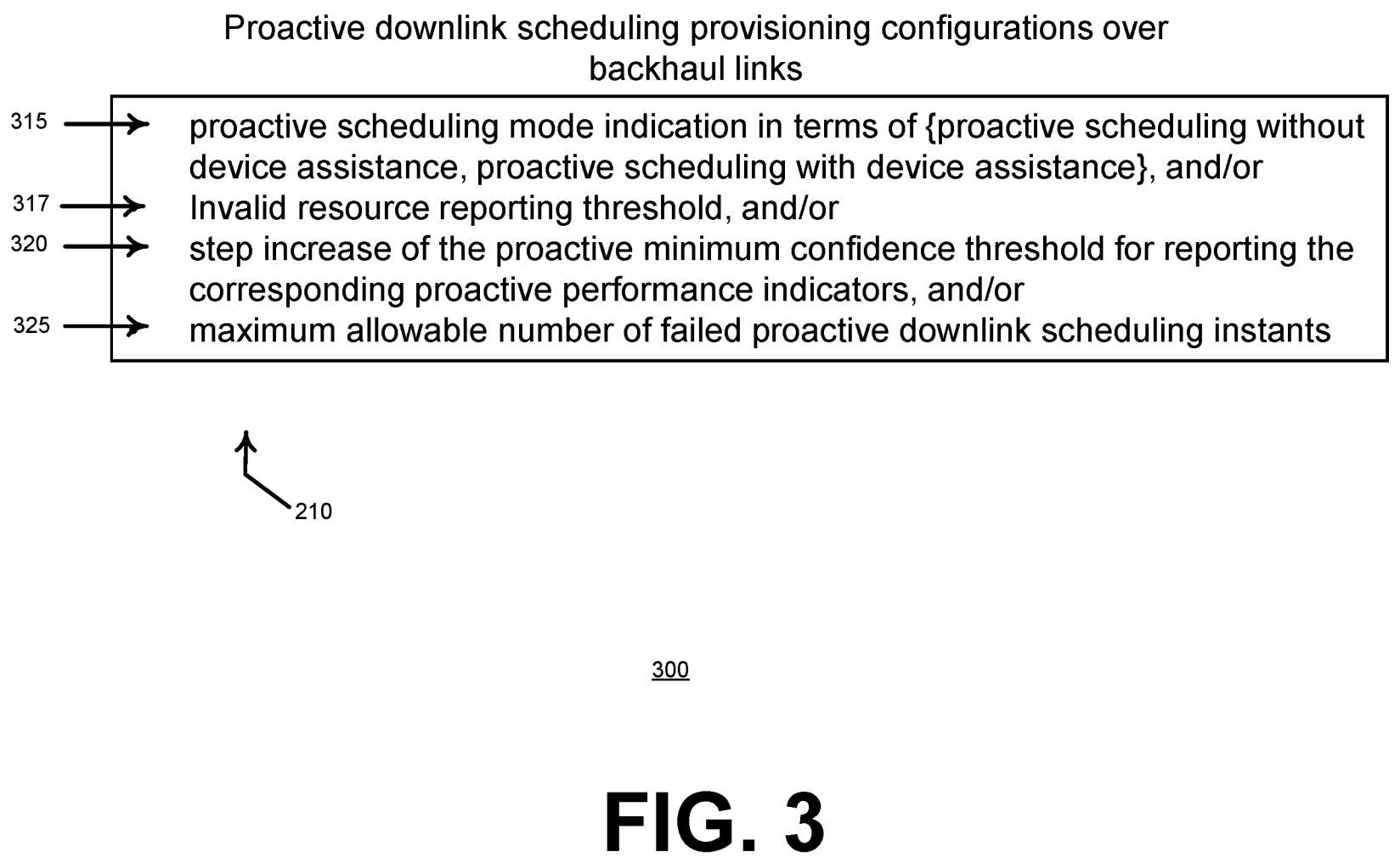

Proactive downlink scheduling provisioning configurations over backhaul links

315 → proactive scheduling mode indication in terms of {proactive scheduling without device assistance, proactive scheduling with device assistance}, and/or 317 → Invalid resource reporting threshold, and/or 320 → step increase of the proactive minimum confidence threshold for reporting the corresponding proactive performance indicators, and/or 325 → maximum allowable number of failed proactive downlink scheduling instants

Proactive radio resource scheduling control configurations

- Existing DCI information elements
- . . .
- Proactive scheduling mode indication in terms of {proactive scheduling without device assistance, proactive scheduling with device assistance};
- Confidence level threshold increase value

410

415

210

400

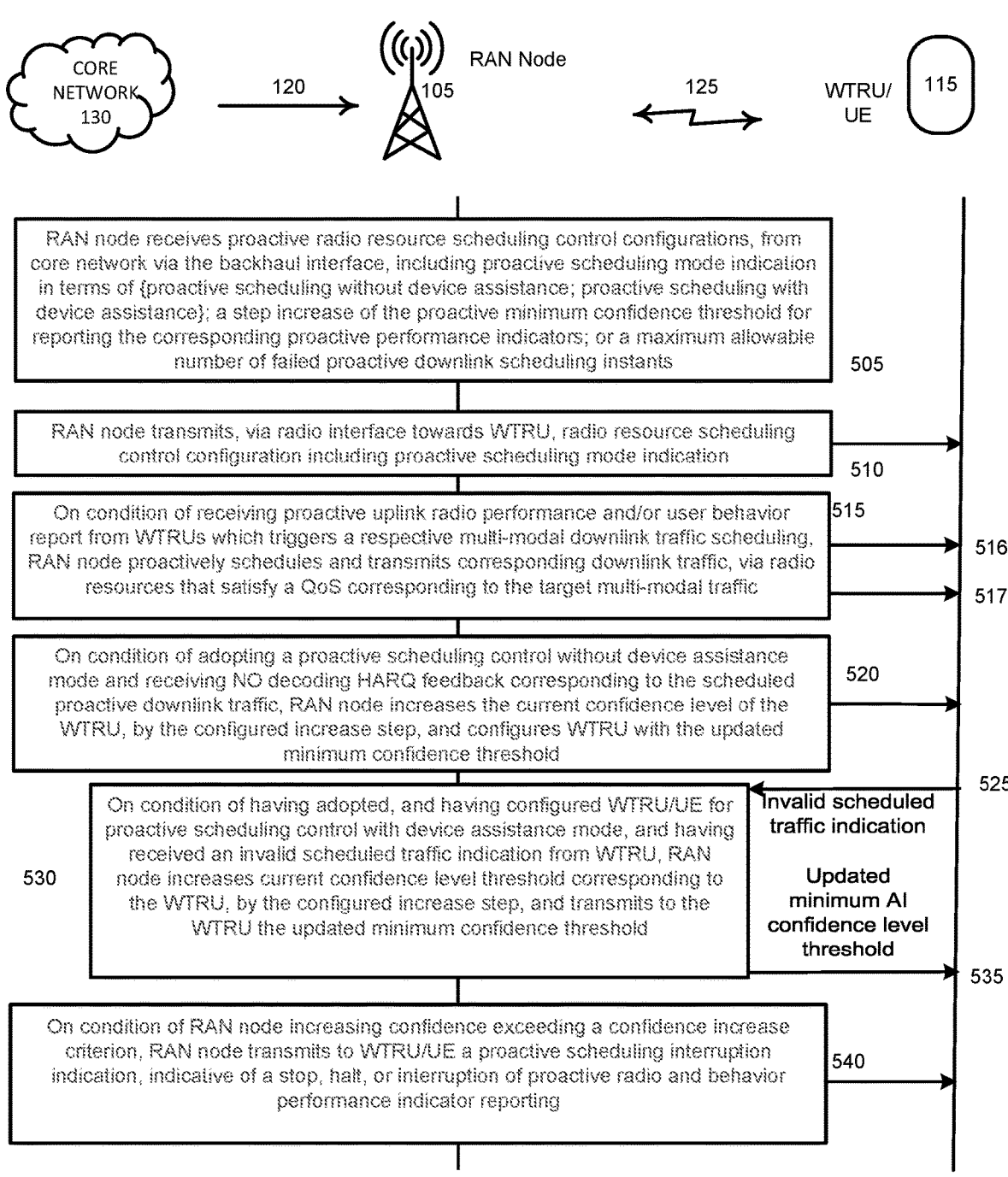

CORE NETWORK 130

RAN Node ((·)) 105

WTRU/ UE 115

120 →

125 ⇄

RAN node receives proactive radio resource scheduling control configurations, from core network via the backhaul interface, including proactive scheduling mode indication in terms of {proactive scheduling without device assistance; proactive scheduling with device assistance}; a step increase of the proactive minimum confidence threshold for reporting the corresponding proactive performance indicators; or a maximum allowable number of failed proactive downlink scheduling instants          505

RAN node transmits, via radio interface towards WTRU, radio resource scheduling control configuration including proactive scheduling mode indication          510

On condition of receiving proactive uplink radio performance and/or user behavior report from WTRUs which triggers a respective multi-modal downlink traffic scheduling, RAN node proactively schedules and transmits corresponding downlink traffic, via radio resources that satisfy a QoS corresponding to the target multi-modal traffic          515     516     517

On condition of adopting a proactive scheduling control without device assistance mode and receiving NO decoding HARQ feedback corresponding to the scheduled proactive downlink traffic, RAN node increases the current confidence level of the WTRU, by the configured increase step, and configures WTRU with the updated minimum confidence threshold          520

On condition of having adopted, and having configured WTRU/UE for proactive scheduling control with device assistance mode, and having received an invalid scheduled traffic indication from WTRU, RAN node increases current confidence level threshold corresponding to the WTRU, by the configured increase step, and transmits to the WTRU the updated minimum confidence threshold          530

525

Invalid scheduled traffic indication

Updated minimum AI confidence level threshold          535

On condition of RAN node increasing confidence exceeding a confidence increase criterion, RAN node transmits to WTRU/UE a proactive scheduling interruption indication, indicative of a stop, halt, or interruption of proactive radio and behavior performance indicator reporting          540

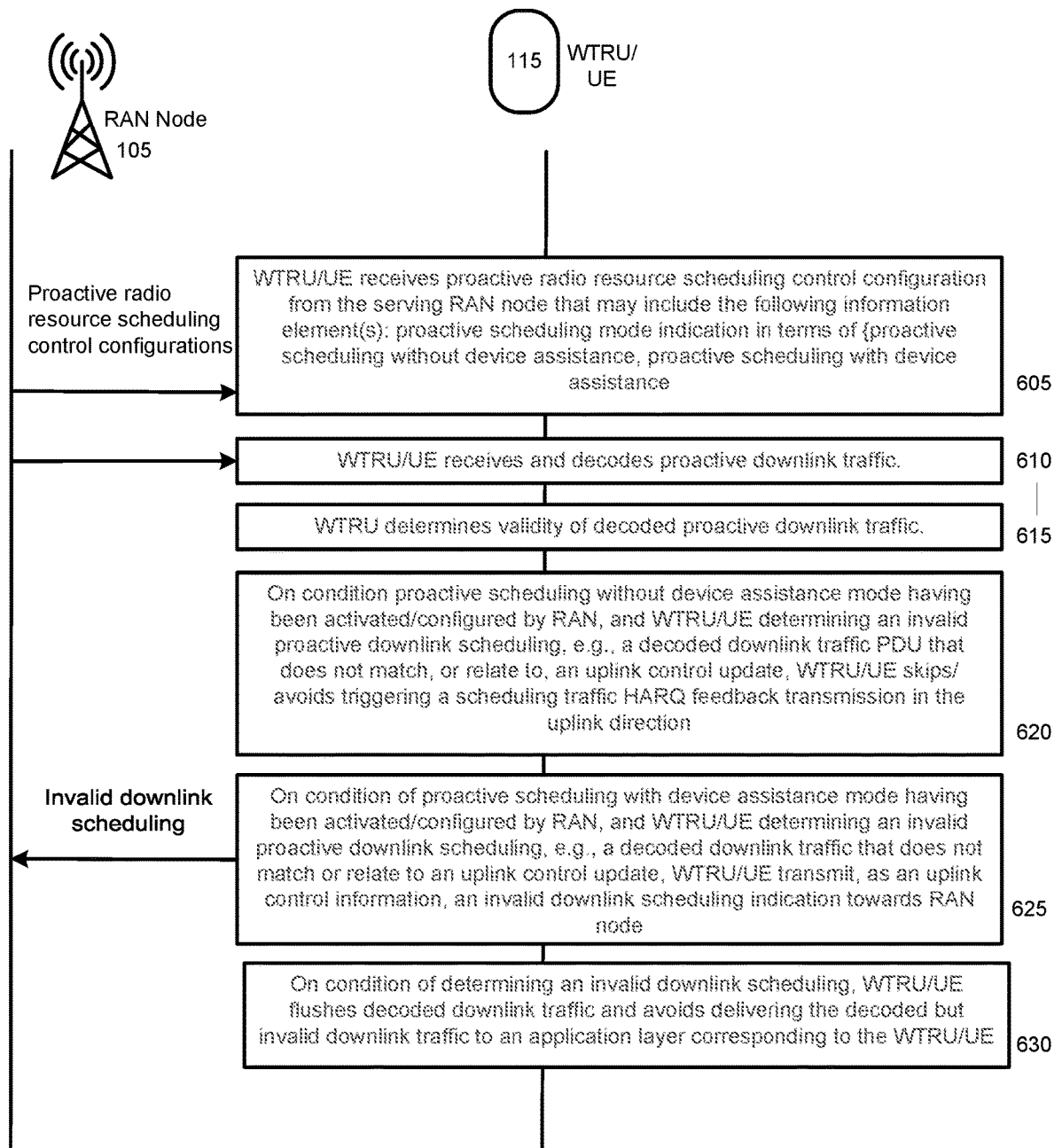

RAN Node
105

115  WTRU/
     UE

Proactive radio
resource scheduling
control configurations

WTRU/UE receives proactive radio resource scheduling control configuration
from the serving RAN node that may include the following information
element(s): proactive scheduling mode indication in terms of {proactive
scheduling without device assistance, proactive scheduling with device
assistance                                                                    605

WTRU/UE receives and decodes proactive downlink traffic.                      610

WTRU determines validity of decoded proactive downlink traffic.               615

On condition proactive scheduling without device assistance mode having
been activated/configured by RAN, and WTRU/UE determining an invalid
proactive downlink scheduling, e.g., a decoded downlink traffic PDU that
does not match, or relate to, an uplink control update, WTRU/UE skips/
avoids triggering a scheduling traffic HARQ feedback transmission in the
uplink direction                                                              620

Invalid downlink
scheduling

On condition of proactive scheduling with device assistance mode having
been activated/configured by RAN, and WTRU/UE determining an invalid
proactive downlink scheduling, e.g., a decoded downlink traffic that does not
match or relate to an uplink control update, WTRU/UE transmit, as an uplink
control information, an invalid downlink scheduling indication towards RAN
node                                                                          625

On condition of determining an invalid downlink scheduling, WTRU/UE
flushes decoded downlink traffic and avoids delivering the decoded but
invalid downlink traffic to an application layer corresponding to the WTRU/UE  630

Figure 9:
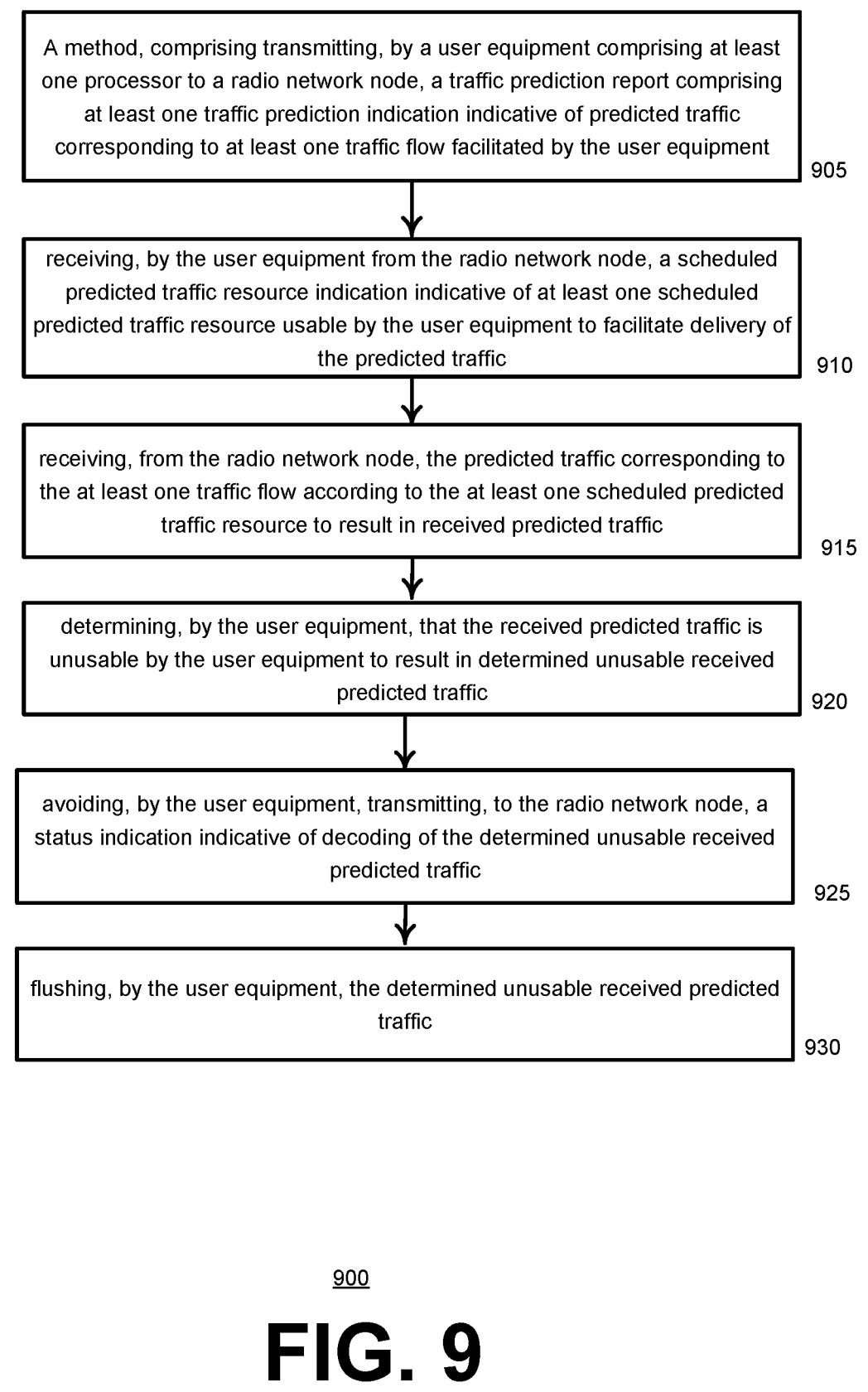

A method, comprising transmitting, by a user equipment comprising at least one processor to a radio network node, a traffic prediction report comprising at least one traffic prediction indication indicative of predicted traffic corresponding to at least one traffic flow facilitated by the user equipment

905 receiving, by the user equipment from the radio network node, a scheduled predicted traffic resource indication indicative of at least one scheduled predicted traffic resource usable by the user equipment to facilitate delivery of the predicted traffic

910 receiving, from the radio network node, the predicted traffic corresponding to the at least one traffic flow according to the at least one scheduled predicted traffic resource to result in received predicted traffic

915 determining, by the user equipment, that the received predicted traffic is unusable by the user equipment to result in determined unusable received predicted traffic

920 avoiding, by the user equipment, transmitting, to the radio network node, a status indication indicative of decoding of the determined unusable received predicted traffic

925 flushing, by the user equipment, the determined unusable received predicted traffic

Figure 10:
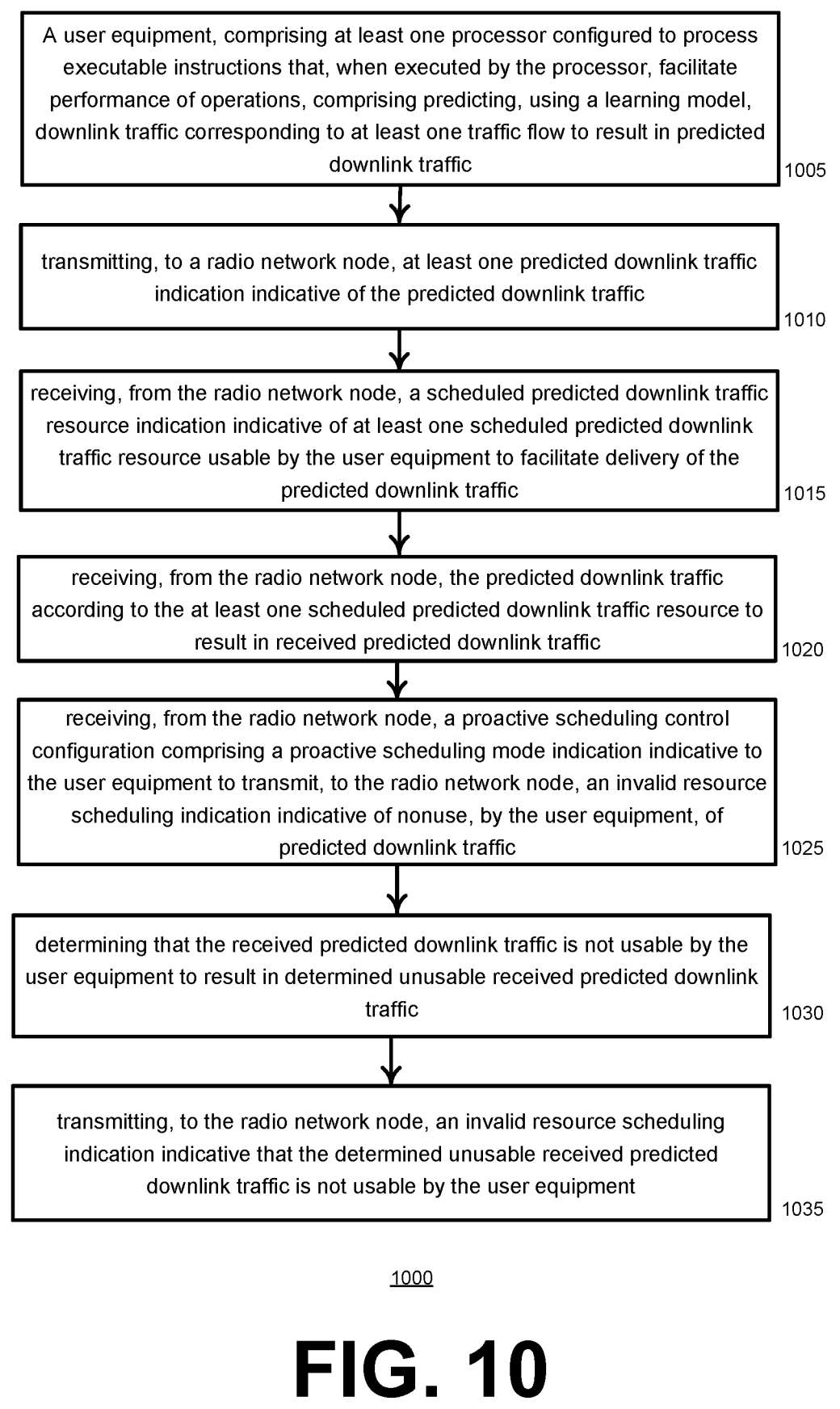

A user equipment, comprising at least one processor configured to process executable instructions that, when executed by the processor, facilitate performance of operations, comprising predicting, using a learning model, downlink traffic corresponding to at least one traffic flow to result in predicted downlink traffic

1005 transmitting, to a radio network node, at least one predicted downlink traffic indication indicative of the predicted downlink traffic

1010 receiving, from the radio network node, a scheduled predicted downlink traffic resource indication indicative of at least one scheduled predicted downlink traffic resource usable by the user equipment to facilitate delivery of the predicted downlink traffic

1015 receiving, from the radio network node, the predicted downlink traffic according to the at least one scheduled predicted downlink traffic resource to result in received predicted downlink traffic

1020 receiving, from the radio network node, a proactive scheduling control configuration comprising a proactive scheduling mode indication indicative to the user equipment to transmit, to the radio network node, an invalid resource scheduling indication indicative of nonuse, by the user equipment, of predicted downlink traffic

1025 determining that the received predicted downlink traffic is not usable by the user equipment to result in determined unusable received predicted downlink traffic

1030 transmitting, to the radio network node, an invalid resource scheduling indication indicative that the determined unusable received predicted downlink traffic is not usable by the user equipment

Figure 11:
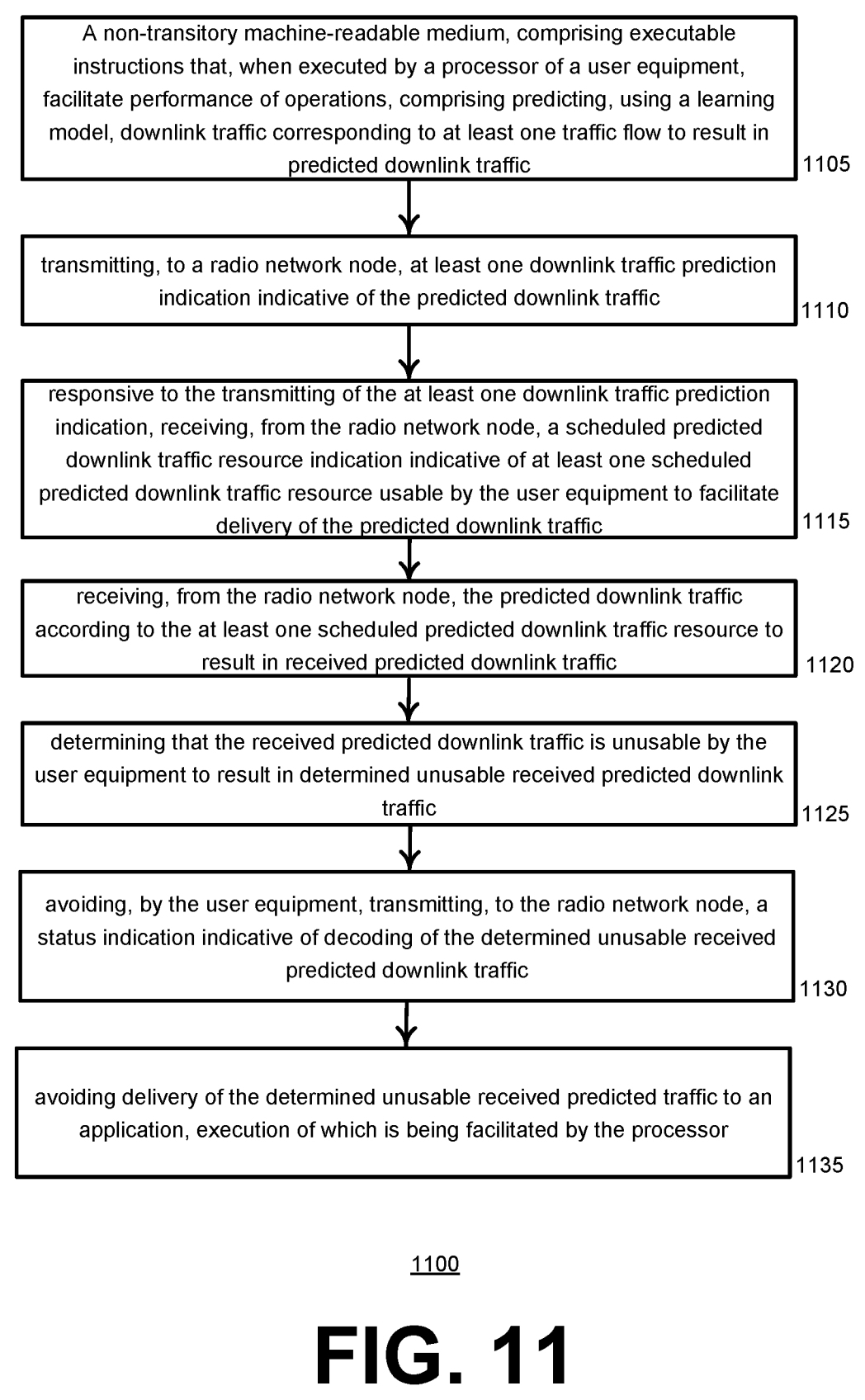

A non-transitory machine-readable medium, comprising executable instructions that, when executed by a processor of a user equipment, facilitate performance of operations, comprising predicting, using a learning model, downlink traffic corresponding to at least one traffic flow to result in predicted downlink traffic
1105 transmitting, to a radio network node, at least one downlink traffic prediction indication indicative of the predicted downlink traffic
1110 responsive to the transmitting of the at least one downlink traffic prediction indication, receiving, from the radio network node, a scheduled predicted downlink traffic resource indication indicative of at least one scheduled predicted downlink traffic resource usable by the user equipment to facilitate delivery of the predicted downlink traffic
1115 receiving, from the radio network node, the predicted downlink traffic according to the at least one scheduled predicted downlink traffic resource to result in received predicted downlink traffic
1120 determining that the received predicted downlink traffic is unusable by the user equipment to result in determined unusable received predicted downlink traffic
1125 avoiding, by the user equipment, transmitting, to the radio network node, a status indication indicative of decoding of the determined unusable received predicted downlink traffic
1130 avoiding delivery of the determined unusable received predicted traffic to an application, execution of which is being facilitated by the processor
1135

PROACTIVE DOWNLINK SCHEDULING VALIDATION

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise transmitting, by a user equipment comprising at least one processor to a radio network node, a traffic prediction report comprising at least one traffic prediction indication indicative of predicted traffic corresponding to at least one traffic flow facilitated by the user equipment, and receiving, by the user equipment from the radio network node, a scheduled predicted traffic resource indication indicative of at least one scheduled predicted traffic resource usable by the user equipment to facilitate delivery of the predicted traffic. The method may comprise receiving, from the radio network node, the predicted traffic corresponding to the at least one traffic flow according to the at least one scheduled predicted traffic resource to result in received predicted traffic. A learning model may be configured to be executed by the user equipment to facilitate predicting the predicted traffic.

In an embodiment, the predicted traffic may be first predicted traffic and the method may further comprise receiving, from the radio network node, a prediction confidence level criterion indication, indicative of a prediction confidence level criterion increase, usable by the user equipment to facilitate prediction of traffic corresponding to the at least one traffic flow, and updating a prediction confidence level criterion according to the prediction confidence level criterion increase to result in an updated prediction confidence level criterion. The method may further comprise predicting, using the learning model, second predicted traffic corresponding to the at least one traffic flow to result in a traffic prediction and a prediction confidence level corresponding to the traffic prediction, and determining that the prediction confidence level satisfies the updated prediction confidence level criterion. Based on the prediction confidence level satisfying the updated prediction confidence level criterion, the method may further comprise transmitting, to the radio network node, a predicted traffic indication, indicative of the traffic prediction, usable by the radio network node to schedule at least one updated scheduled predicted traffic resource usable by the user equipment to facilitate delivery of the second predicted traffic. The method may comprise receiving, by the user equipment, the second predicted traffic according to the at least one updated scheduled predicted traffic resource.

In an embodiment, the method may further comprise determining, by the user equipment, that the received predicted traffic is unusable by the user equipment to result in determined unusable received predicted traffic, and avoiding, by the user equipment, transmitting, to the radio network node, a status indication indicative of decoding of the determined unusable received predicted traffic. The method may further comprise flushing, by the user equipment, the determined unusable received predicted traffic. The status indication that the user equipment avoids transmitting may be one of: an acknowledgement (ACK) or a negative acknowledgement (NACK).

In an embodiment, the method may further comprise receiving, by the user equipment from the radio network node, a proactive scheduling control configuration comprising a proactive scheduling mode indication indicative to the user equipment to transmit, to the radio network node, an invalid resource scheduling indication indicative of nonuse, by the user equipment, of predicted traffic, and determining, by the user equipment, that the received predicted traffic is unusable by the user equipment to result in determined unusable received predicted traffic. The method may further comprise transmitting, by the user equipment to the radio network node, an invalid resource scheduling indication indicative that the determined unusable received predicted traffic is unusable by the user equipment. The method may further comprise flushing, by the user equipment, the determined unusable received predicted traffic.

In an embodiment, the method may further comprise receiving, from the radio network node, a proactive scheduling interruption indication indicative to the user equipment to discontinue traffic prediction reporting corresponding to the at least one traffic flow. The method may further comprise facilitating, by the user equipment, delivery of the at least one traffic flow according to at least one of: requesting, by the user equipment from the radio network node, scheduling of resources to facilitate delivery of traffic, corresponding to the at least one traffic flow, that has been generated; or via configured resource occasions.

In another example embodiment, a user equipment may comprise at least one processor configured to process executable instructions that, when executed by the processor, facilitate performance of operations that may comprise predicting, using a learning model, downlink traffic corresponding to at least one traffic flow to result in predicted downlink traffic, and transmitting, to a radio network node, at least one predicted downlink traffic indication indicative of the predicted downlink traffic. The operations may further comprise receiving, from the radio network node, a scheduled predicted downlink traffic resource indication indicative of at least one scheduled predicted downlink traffic resource usable by the user equipment to facilitate delivery of the predicted downlink traffic. The method may comprise receiving, from the radio network node, the predicted downlink traffic according to the at least one scheduled predicted downlink traffic resource to result in received predicted downlink traffic.

In an embodiment, the at least one predicted downlink traffic indication may be a first predicted downlink traffic indication and the predicted downlink traffic may be first predicted downlink traffic. The operations may further comprise receiving, from the radio network node, a prediction confidence level criterion increase indication, indicative of a prediction confidence level criterion increase, applicable to a prediction confidence level criterion usable by the user equipment to facilitate delivery of a second predicted downlink traffic indication, and increasing the prediction confidence level criterion according to the prediction confidence level criterion increase to result in an increased prediction confidence level criterion. The method may further comprise predicting, using the learning model, second predicted downlink traffic corresponding to the at least one traffic flow to result in the second predicted downlink traffic indication and a prediction confidence level corresponding to the second predicted downlink traffic indication, and determining that the prediction confidence level satisfies the increased prediction confidence level criterion. Based on the prediction confidence level satisfying the increased prediction confidence level criterion, the operations may further comprise transmitting, to the radio network node, the second predicted downlink traffic indication, usable by the radio network node to schedule at least one updated scheduled predicted downlink traffic resource usable by the user equipment to facilitate delivery of the second predicted downlink traffic. The operations may comprise receiving, by the user equipment, the second predicted downlink traffic according to the at least one updated scheduled predicted traffic downlink traffic resource.

In an embodiment, the operations may further comprise determining, by the user equipment, that the received predicted downlink traffic is not usable by the user equipment to result in determined unusable received predicted downlink traffic, and avoiding, by the user equipment, transmitting, to the radio network node, a status indication indicative of decoding of the determined unusable received predicted downlink traffic.

In an embodiment, the operations may further comprise receiving, from the radio network node, a proactive scheduling control configuration comprising a proactive scheduling mode indication indicative to the user equipment to transmit, to the radio network node, an invalid resource scheduling indication indicative of nonuse, by the user equipment, of predicted downlink traffic, determining that the received predicted downlink traffic is not usable by the user equipment to result in determined unusable received predicted downlink traffic, and transmitting, to the radio network node, an invalid resource scheduling indication indicative that the determined unusable received predicted downlink traffic is not usable by the user equipment.

In an embodiment, the operations may further comprise based on a determination by the radio network node that an increased prediction confidence level criterion corresponds to violation of a predicted confidence level criterion increase criterion, receiving, from the radio network node, a proactive scheduling interruption indication indicative to the user equipment to discontinue traffic prediction reporting corresponding to the at least one traffic flow. The operations may comprise initiating delivery of the at least one traffic flow according to at least one of: requesting, from the radio network node, scheduling of resources to facilitate delivery of downlink traffic, corresponding to the at least one traffic flow, that has been generated; or via configured resource occasions.

In yet another example embodiment, a non-transitory machine-readable medium may comprising executable instructions that, when executed by a processor of a user equipment, facilitate performance of operations that may comprise predicting, using a learning model, downlink traffic corresponding to at least one traffic flow to result in predicted downlink traffic, and transmitting, to a radio network node, at least one downlink traffic prediction indication indicative of the predicted downlink traffic. Responsive to the transmitting of the at least one downlink traffic prediction indication, the operations may further comprise receiving, from the radio network node, a scheduled predicted downlink traffic resource indication indicative of at least one scheduled predicted downlink traffic resource usable by the user equipment to facilitate delivery of the predicted downlink traffic. The operations may comprise receiving, from the radio network node, the predicted downlink traffic according to the at least one scheduled predicted downlink traffic resource to result in received predicted downlink traffic.

In an embodiment, the predicted downlink traffic may be first predicted downlink traffic. The at least one downlink traffic prediction indication may be a first downlink traffic prediction indication. The at least one scheduled predicted downlink traffic resource may be a first at least one scheduled predicted downlink traffic resource. The operations may further comprise receiving, from the radio network node, a prediction confidence level criterion indication, indicative of a prediction confidence level criterion increase, usable by the user equipment to facilitate increasing a prediction confidence level criterion and updating the prediction confidence level criterion according to the prediction confidence level increase to result in an increased prediction confidence level criterion. The operations may further comprise predicting, using the learning model, second downlink traffic corresponding to the at least one traffic flow to result in second predicted downlink traffic, and transmitting, to the radio network node, a second downlink traffic prediction indication indicative of the second predicted downlink traffic, usable by the radio network node to schedule a second at least one scheduled predicted downlink traffic resource usable by the user equipment to facilitate delivery of the second predicted downlink traffic. The operations may comprise receiving, by the user equipment, the second predicted downlink traffic according to the at least one second at least one scheduled predicted downlink traffic resource.

In an embodiment, the operations may further comprise determining that the received predicted downlink traffic is unusable by the user equipment to result in determined unusable received predicted downlink traffic, and avoiding, by the user equipment, transmitting, to the radio network node, a status indication indicative of decoding of the determined unusable received predicted downlink traffic. In an embodiment, the operations may further comprise flushing, by the user equipment, the determined unusable received predicted downlink traffic. In an embodiment, the operations may further comprise avoiding delivery of the determined unusable received predicted traffic to an application, execution of which is being facilitated by the processor.

BRIEF DESCRIPTION OF THE DRAWINGS

FIG. 3 illustrates an example proactive scheduling control configuration.

FIG. 5 illustrates a timing diagram of an example method to use a learning model at a user equipment to facilitate a radio access network node scheduling downlink traffic predicted by the user equipment.

FIG. 6 illustrates a timing diagram of an example method to validate proactive downlink scheduling.

FIG. 9 illustrates a block diagram of an example method.

FIG. 10 illustrates a block diagram of an example user equipment.

FIG. 11 illustrates a block diagram of an example non-transitory machine-readable medium.

DETAILED DESCRIPTION OF THE DRAWINGS

Figure 1:
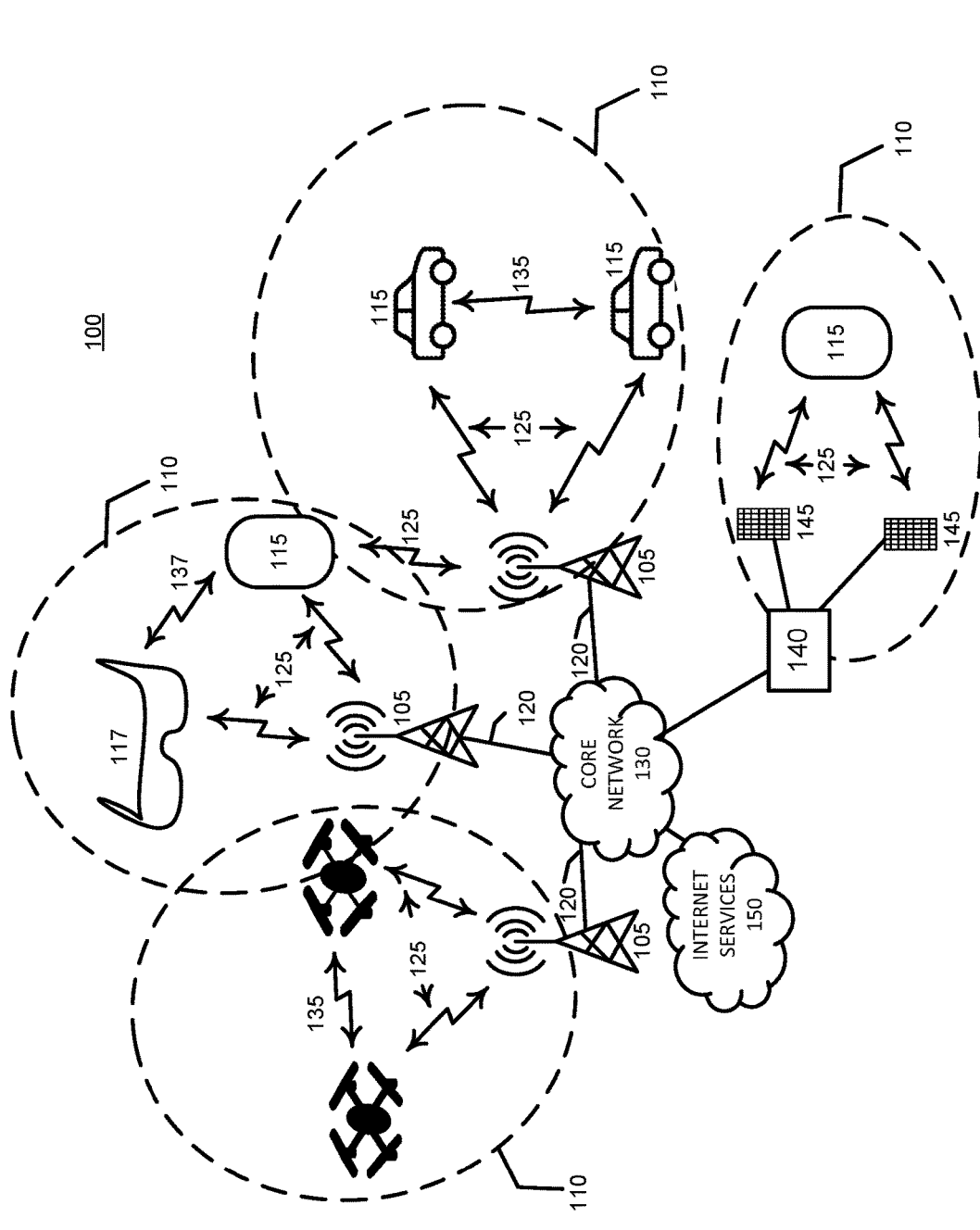
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Artificial intelligence ("AI") and machine learning ("ML") models may facilitate performance and operational functionality and improvements in 5G implementation, such as, for example, network automation, optimizing signaling overhead, energy conservation at devices, and traffic-capacity maximization. An artificial intelligence machine learning models ("AI/ML model") functionality can be implemented and structured in many different forms and with varying vendor-proprietary designs. A 5G radio access network node ("RAN") of a network to which the user equipment may be attached or with which the user equipment may be registered may manage or control real-time AI/ML model performance at different user equipment devices for various radio functions As disclosed herein, several embodiments facilitate dynamic management and updating of various AI/ML models deployed at different user equipment devices. A network RAN can dynamically control activation, deactivation, triggering of model retraining (that may be radio-function-specific) or updating of a learning model depending on monitoring and analysis of defined real-time performance metrics corresponding to a learning model being executed at a user equipment. It will be appreciated that even though a learning model may be implementing a particular radio function, metrics that are monitored or analyzed may be learning model metrics, not necessarily radio function metrics (e.g., a mathematical/statistical metric not necessarily a radio function metric such as, for example, signal strength).

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (eg, an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta$f) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors.

The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Artificial intelligence ("AI") learning models ("LM") may be used by components of wireless cellular radio networks to facilitate radio operations and function, which may result in network system gains in terms of, for example, data capacity, reduction in network and user equipment energy consumption, and signalling overhead reduction. Radio resource scheduling is an aspect of radio access networking that may benefit from use of AI/ML, use of which may result in improvements with respect to latency and capacity, especially with respect to scheduling of traffic flows associated with stringent delay and capacity criteria. For example, for delivery of multimodal traffic corresponding to a stringent cross-traffic latency budget (e.g., traffic corresponding to a downlink traffic flow that is related to an uplink traffic flow and that may be triggered by an application based on related uplink traffic according to a configured QoS), operation of resource scheduler at a serving RAN node may fail to schedule adequate resources to satisfy a stringent cross-traffic downlink-uplink delay budget. However, with implementation of AI-capable user equipment devices and AI learning models used by a radio scheduler at a serving RAN node, user equipment devices may proactively/prospectively predict and report soon-to-occur user device application behaviour. Thus, a radio scheduler at a RAN node that is serving a user equipment that reported the prospectively predicted application behavior may become able to proactively allocate adequate resources for delivery downlink traffic that maybe related to uplink traffic transmitted by the user equipment to the serving RAN node, and thus facilitating delivery of latency-stringent multimodal traffic services.

When used with respect to wireless communication networks, artificial intelligence and machine learning may facilitate performance and operational advantages such as network automation, signaling overhead reduction, energy saving, and capacity enhancement. A radio aspect that may be facilitated by AI models relates to radio resource scheduling. An AI-capable user equipment device may predict soon-to-occur performance or user behavior and may report the predicted behavior to a serving RAN node. The serving RAN node may use the predictions to prospectively schedule resources or to prospectively facilitate delivery of predicted traffic. For example, a downlink traffic packet may be scheduled for delivery, or actually delivered, to a user equipment device based on predicted, yet-to-occur, operation at the user equipment. An advantage of such proactive/prospective scheduling is a significant reduction in delay with respect to scheduling of traffic.

However, severe AI error propagation may occur that may lead to a significant degradation of the radio spectral efficiency. For example, user equipment operation that is poorly predicted by an AI model may 'mislead' proactive scheduling at the serving RAN node, which may result from proactively allocating radio resources for carrying downlink traffic that is predicted, based on user equipment device behavior that eventually does not occur, thus resulting in proactively-allocated resources for traffic delivery being. Misallocation by a RAN node of radio resources may result from inconsistent or nonstandard reporting of AI model behavior by various different user equipment device implementations and a large number of different AI model structures that may be implemented on different user equipment devices.

An AI/ML implementation, according to conventional techniques to facilitate multimodal traffic delivery, may induce AI model errors. For example, with conventional AI/ML-facilitated radio resource scheduling, a poorly functioning AI learning model at an active user equipment device may significantly mislead a RAN node serving the active user equipment into overscheduling or underscheduling radio resources due to reporting of inaccurately predicted user equipment application behaviours, leading to either degraded radio link performance or reduced overall spectral efficiency of a radio link with respect to the active user equipment or with respect to other user equipment being served by the serving RAN node. A large number of user equipment may be served by a RAN node and thus different AI model structures may be used by different user equipment to facilitate radio scheduling. According to conventional techniques, a RAN node serving multiple user equipment may not require information regarding different AI models used by different user equipment and may schedule resources responsive to a traffic prediction received from a user equipment without having received information corresponding to operation and performance of a learning model at a user equipment. Therefore, embodiments disclosed herein may facilitate a scheduling control and reporting procedure with respect to AI learning models that may facilitate prediction of traffic.

According to embodiments disclosed herein, novel proactive radio resource scheduling implemented at a RAN node that may be serving AI-capable user equipment devices may facilitate the RAN node dynamically enforcing a user equipment device-common minimum AI model performance accuracy criterion at different user equipment devices regardless of how one or more AI model(s) may be implemented at different user equipment devices. Such proactive radio resource scheduling may facilitate avoiding scheduling of resources based on a poorly functioning AI model at a certain user equipment device that may result in misleading the RAN node with respect to scheduling resources for use by the certain user equipment for delivery of traffic.

Embodiments disclosed herein may facilitate dynamic user equipment device scheduling validation, wherein AI-capable user equipment devices may validate current resource scheduling or received traffic. Such scheduling validation may increase the likelihood that proactively scheduled radio resource grants match actual user equipment device behavior (e.g., the user equipment may validate to a serving RAN node that the user equipment accurately predicted and reported user equipment behavior to the RAN node based on receiving usable traffic according to radio resources proactively scheduled by the serving RAN). Accordingly, the user equipment may avoid receiving, decoding, or transferring, to an application being executed by an application layer corresponding to the user equipment, an indication of predicted/proactively scheduled radio resources or traffic corresponding to predicted application behavior that failed to occur (e.g., the user equipment may facilitate the RAN in avoiding scheduling of resources for delivery of traffic that is not usable by the user equipment and that was predicated on a prediction of behavior that did not occur, and thus may be referred to as invalid traffic or an invalid scheduling of resources). According to embodiments disclosed herein, an AI-capable user equipment device may explicitly or implicitly report, to a serving RAN node, a scheduling validation state. Thus, the AI-capable device may be enabled by the serving RAN to facilitate fine-tuning by the RAN node of resource scheduling based on the user equipment assessing and reporting to the RAN node scheduling validation metrics without the RAN node being apprised of particular AI model implementation at the reporting user equipment devices.

Proactive Downlink Radio Scheduling Control.

According to conventional techniques, a RAN node schedules downlink resources based on either a scheduling request from a user equipment device or periodically via grants of predefined/configured resource occasions. A downside of request-based scheduling is scheduling delay due to the multiple bidirectional control information exchanges between a user equipment and a serving RAN node before traffic is actually scheduled, which can result in a decrease in spectral efficiency when traffic is not continuously available for delivery via the scheduled resources. A similar downside may exist with respect to preconfigured resource grants if traffic is not continuously available for delivery via the scheduled resources. According to embodiments disclosed herein, a RAN node may proactively schedule resources for delivery of downlink traffic corresponding to a predicted user equipment device behavior that is yet to occur, which may result in a reduction of scheduling delay when the predicted device behavior occurs since downlink resources or downlink traffic has already been scheduled.

According to conventional techniques, an absence of decoding feedback from user equipment may imply that user equipment could not successfully decode or detect the scheduled traffic and thus may indicate to the RAN node to re-transmit the same payload to the user equipment. According to an embodiment disclosed herein, absence of decoding feedback reporting corresponding to a packet/protocol data unit (e.g., failure to receive a HARQ feedback indication from a user equipment corresponding to a receiving status associated with the packet) may be indicative to the serving RAN node that the packet was unused, or unusable, by the user equipment (e.g., the packet is deemed 'invalid') and that the resource scheduled and used to deliver the packet should not have been scheduled. Instead of triggering retransmission of a packet corresponding to which decoding feedback is not received as would be the case according to conventional techniques, according to embodiments disclosed herein failure to receive feedback corresponding to a transmitted packet may cause a serving RAN node to indicate to a user equipment to which the packet was directed to implement more conservative AI model traffic-prediction reporting, which may result in a reduction in erroneous resource scheduling by the RAN node.

Figure 2:
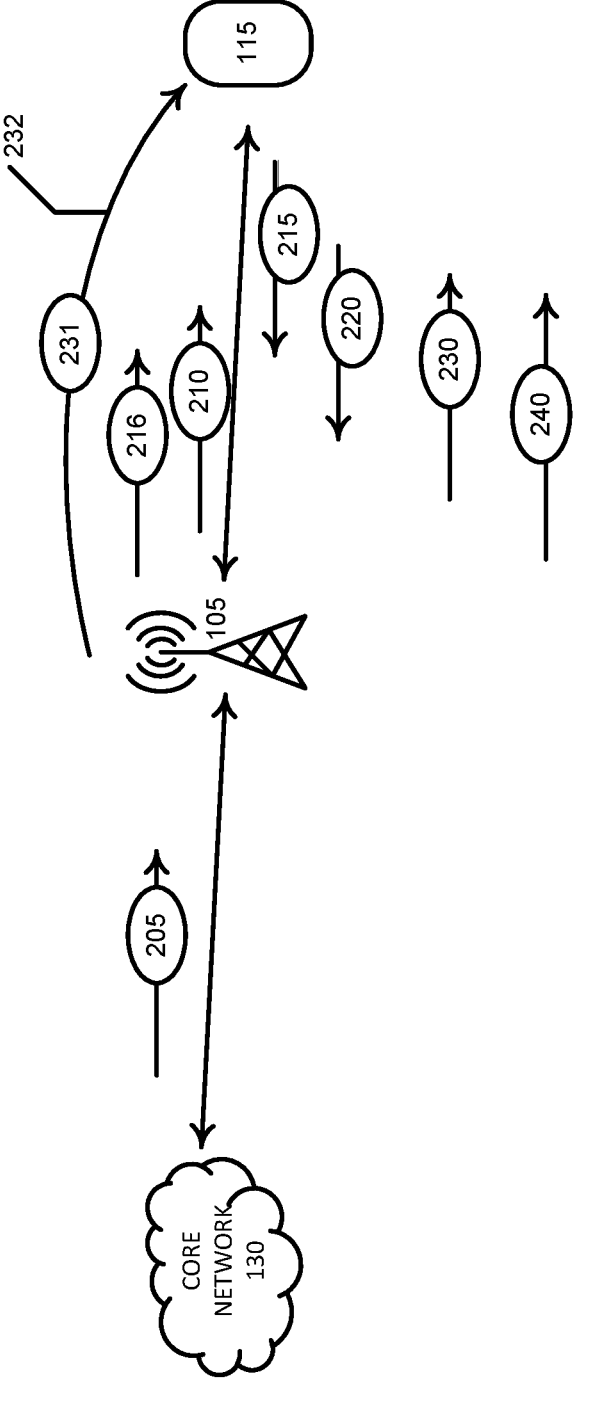
FIG. 2 illustrates an example environment with a radio access network node scheduling predicted downlink traffic to a user equipment that uses a learning model to predict the predicted downlink traffic.

Turning now to FIG. 2, the figure illustrates environment 200 wherein RAN node 105 may facilitate receiving, from a network computing equipment of core network 130, proactive scheduling control configuration 205. Proactive scheduling control configuration 205 may comprise a predicted confidence level criterion. Proactive scheduling control configuration 205 may comprise a confidence level step increase value, which may be used by RAN node 105 to indicate, via a prediction confidence level indication to user equipment 115, a prediction confidence level threshold increase to be usable by the user equipment to adjust a confidence level threshold to facilitate reporting of prediction of traffic corresponding to at least one traffic flow being facilitated by RAN node 105.

In addition to the predicted confidence level criterion and the confidence level step increase value, configuration 205 may comprise a proactive scheduling mode indication indicative of a first mode associated with proactive scheduling of resources without validity assistance by UE 115 or a second mode associated with proactive scheduling of resources with validity assistance by the user equipment. 'Device assistance' may refer to UE 115 transmitting to RAN node 105 an invalid resource scheduling indication 220 to report nonuse of a packet transmitted by RAN node 105. Device assistance reporting of an invalid resource scheduling indication 220 may facilitate proactive radio resource scheduling by the RAN node. RAN 105 may configure user equipment 115, via a proactive scheduling control configuration 210, to transmit to RAN node 105 an invalid resource scheduling indication 220 if the user equipment receives from the RAN node a packet that the user equipment does not use. Radio resource scheduling configuration 210 may comprise a proactive scheduling mode indication that corresponds to a similar proactive scheduling mode indication indicated in configuration 205 received by RAN node 105 from core network equipment 130.

An invalid resource scheduling indication 220 received from user equipment 115 may facilitate RAN node 105 enforcing uniform proactive scheduling performance with respect to different AI-capable user equipment devices having different AI model structures and accuracies. For example, device assisted feedback comprising an invalid resource scheduling indication 220 may be useful when a poorly-functioning AI model at user equipment 115 may mislead RAN node 105 with respect to resource scheduling that is/was based on a prediction report 215, received from the user equipment, that may be a prediction report that comprises a traffic prediction indication, or a behavior prediction indication, that may be indicative of predicted traffic 231 corresponding to traffic flow 232. In an embodiment, prediction report 215 may be a behavior prediction report that predicts behavior that may result in uplink traffic that corresponds to a downlink traffic flow, such as traffic flow 232, that may be related to the behavior, or predicted uplink traffic, predicted by the learning model at the user equipment.

Responsive to an uplink traffic prediction indication that may be included in prediction report 215, RAN node 105 may schedule at least one resource to facilitate delivery of predicted downlink traffic 231 to result in at least one scheduled predicted traffic resource. RAN node 105 may facilitate transmission of a scheduled predicted traffic resource indication 216 indicative of the at least one scheduled predicted traffic resource usable by the user equipment to facilitate delivery (e.g., to facilitate receiving) of predicted downlink traffic 231. RAN node 105 may facilitate delivery of predicted traffic 231 to the user equipment according to the at least one scheduled predicted traffic resource.

Turning now to FIG. 3, the figure illustrates an example proactive scheduling control configuration message 300, which may comprise proactive scheduling control configuration information 205. Configuration information 205 may correspond to a particular traffic flow corresponding to a user equipment and may comprise proactive scheduling mode indication 315. As described in reference to FIG. 2, proactive scheduling mode indication 315 may indicate whether a RAN node that receives configuration information 205 is to configure a user equipment to transmit to the RAN node an invalid resource scheduling indication 220 to report nonuse of a packet transmitted received from the RAN node by the user equipment. Configuration information 205 may comprise step increase value 320, which may be used by a RAN node that receives configuration information 205 to indicate to a user equipment an amount to increase a confidence level threshold 317, or a previously increased confidence level threshold, corresponding to a learning model that the user equipment may use to predict behavior or traffic corresponding to predicted behavior. RAN 105 may indicate to UE 115 an amount to increase a confidence level criterion via a prediction confidence level criterion indication 240 that may be indicative of, or that may correspond to, a determined increased prediction confidence level criterion, and that may be usable by UE 115 to increase a confidence level criterion corresponding to a learning model used to facilitate prediction of behavior, or traffic, corresponding to traffic flow 232. Analysis of a confidence level corresponding to the learning model with respect to a confidence level criterion, which may be an initial confidence level criterion or an adjusted/increased confidence level criterion, to determine when/whether to transmit a prediction report 215 to RAN 105.

RAN node 105 may instruct/configure the user equipment 115 to implement transmission of device assistance feedback comprising an invalid resource scheduling indication 220. RAN node 105 may configure UE 115 to increase a confidence level threshold by an increase amount configured via configuration 205 in field 317. User equipment 115 may be configured to avoid transmitting a behavior/uplink traffic prediction report 215 if a learning model confidence level corresponding to a learning model used to predict uplink traffic, or behavior that may result in uplink traffic, does not satisfy the confidence level criterion. User equipment 115 may configure an increase to a confidence level criterion via configuration message 400, that may comprise configuration information 210. If a confidence level corresponding to the learning model drops below initial confidence threshold 317, or an increased confidence threshold that has been increased by one or more step increase amounts 320, user equipment 115 may refrain from transmitting prediction reports to RAN node 105. It will be appreciated that initial confidence threshold 317 may be received via configuration 205 from equipment corresponding to core network 130, or a RAN node may determine a confidence threshold with which to configure a user equipment to result in a RAN-determined confidence threshold wherein the RAN-determined confidence threshold may be determined based on network conditions, for example congestion, interference, or other conditions that may vary and thus may cause availability of radio resources to vary. Thus, the radio access network node may instruct the user equipment to increase the confidence level threshold, via indication 210, if a traffic prediction, predicted by a learning model at the user equipment, has caused the radio access network node to schedule resources to facilitate delivery of predicted traffic that results in the scheduled resources not being optimized for transmission of valid traffic to the user equipment. Transmission, by a user equipment, of an invalid resource scheduling indication 220 may result in increased control channel overhead with respect to the RAN node compared to operation according to a mode that does not require device assistance, wherein failure to receive a HARQ feedback status indication from the user equipment device is indicative that the user equipment received a packet but discarded the packet as being unusable, but by affirmatively receiving an invalid resource scheduling indication 220 to indicate that a packet was received but discarded/unused/invalid the radio access network node may better-tune scheduling of resources corresponding to predicted traffic to result in a reduction of scheduling of, or use of, resources to transmit traffic that is ultimately unused by the user equipment.

Therefore, regardless of a type, structure, implementation, version, or other characteristic corresponding to learning models that may vary among different user equipment, since many learning models may generate or use a confidence level, a confidence level threshold may be used as a universal criterion that is usable by different user equipment implementing different learning models to determine whether to predict uplink traffic or to predict behavior that may result in uplink traffic or whether to transmit a prediction report to the RAN node that is indicative of predicted behavior/traffic. Thus, if a RAN node detects or determines an invalid proactive scheduling of resource (e.g., a proactively scheduled resource corresponds to an invalid/unused packet and thus the resource is effectively unused and wasted), the RAN node may increase, via step increase value 320, a minimum required model confidence threshold at the user equipment by the configured increase step to enable the UE to determine whether to report a prediction of behavior/uplink traffic to the radio access network node.

Configuration information 205 may comprise predicted confidence level criterion 325 which may comprise a number of times a confidence threshold in increased by step increase value 320. If a RAN node indicates, more than a number of times indicated by criterion 325, to a user equipment to increase a confidence level threshold that the user equipment uses to determine whether to transmit a traffic prediction to the radio access network node, the node may disable or deactivate predicting of traffic by the user equipment and corresponding proactive resource scheduling based on AI-model predicting of traffic by the user equipment.

Figure 4:
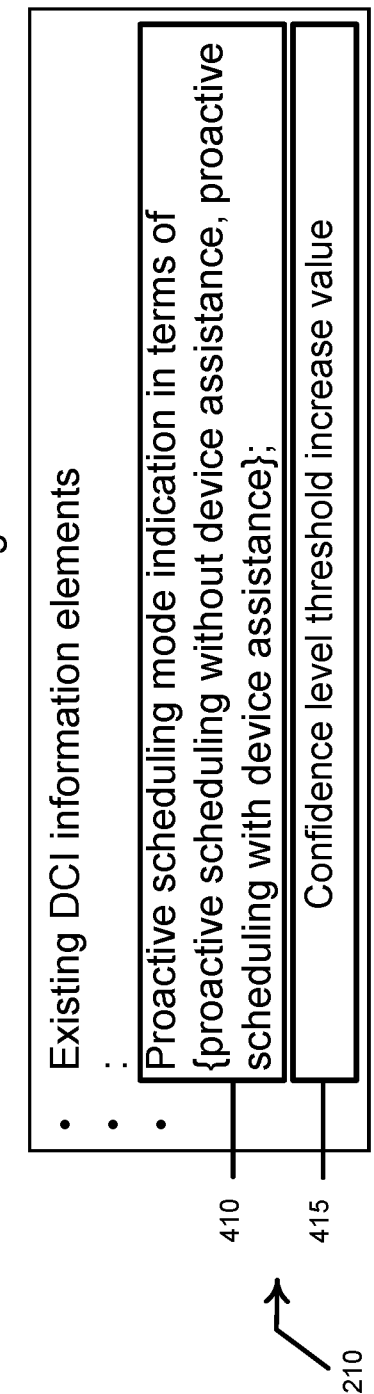
FIG. 4 illustrates an example resource scheduling configuration.

Turning now to FIG. 4, the figure illustrates an example radio resource scheduling configuration message 400, which may comprise radio resource scheduling configuration information 210. Configuration information 210 may comprise a proactive scheduling mode indication 410, similar to mode indication 315 in configuration 205 received by a RAN node from a core network component. In an embodiment, proactive scheduling mode indication 410 may be determined by the RAN node. In an embodiment, proactive scheduling mode indication 410 may be determined by network equipment or received from core network equipment, in which case indication 410 may be the same indication as indication 315. Configuration message 400 may comprise a confidence level increase value in field 415. A value indicated in field 415 may be a value indicated in field 325 of configuration 205 received by a radio access network node from core networking equipment. An indication in a confidence level criterion indication 240 may be indicative to increase a confidence level criterion by an amount contained in field 415 of configuration information 210.

On condition of receiving, from WTRU/UE 115, a behavior/traffic prediction report 215 indicative of multi-modal downlink traffic that is expected or predicted to occur, RAN node 105 may proactively schedule resources that satisfy, or transmit downlink traffic via resources that have been scheduled to satisfy, a QoS requirement corresponding to the target multi-modal traffic. For example, downlink traffic may be predicted based on user activity that may result in uplink traffic to which the predicted downlink traffic may be responsive and resources may be scheduled such that a latency between an occurrence of an action, or generating of uplink traffic, at a user equipment and the receiving of corresponding predicted downlink traffic is satisfied. On condition of adopting proactive resource scheduling without device assistance mode and receiving no decoding HARQ feedback corresponding to proactively scheduled and transmitted downlink traffic, RAN node 105 may increase the current confidence level criterion corresponding to WTRU/UE 115, by configured step increase value 315. The updated/increased/adjusted confidence level criterion, which may be a threshold value, may be used by the user equipment to determine if a confidence level corresponding to a learning model being used to predict traffic falls below the update minimum confidence threshold. If the confidence level corresponding to the learning model falls below, or otherwise doesn't satisfy the threshold, the user equipment may avoid transmission of reports 215 until the learning model confidence level satisfies the confidence level criterion.

If UE 115 determines that a received proactively scheduled downlink traffic packet is invalid (e.g., the user equipment receives downlink traffic corresponding to predicted user behavior or generation of uplink traffic that does not occur and thus is incorrectly predicted by the user equipment) the user equipment may flush the decoded downlink traffic packet and may not trigger transmission of decoding feedback (e.g., the user equipment may not transmit a HARQ status indication) towards the serving RAN node, wherein absence of HARQ decoding feedback may be indicative to the RAN node that the proactively scheduled resource was used to deliver an unused packet. After determining that a scheduled resource was used to deliver invalid traffic, the RAN node may become more conservative in proactive scheduling of predicted traffic by increasing a minimum required confidence level threshold corresponding to the learning model at the user equipment before continuing with proactive downlink scheduling. On condition of RAN node 105 instructing user equipment 115 to increase the confidence level threshold a number of times equal to, or greater than, a maximum number criterion indicated in field 325, RAN node 105 may transmit and configure WTRU/UE 115 with a proactive scheduling interruption indication 230, indicating to UE 115 that RAN node 105 has interrupted predicted behavior/traffic reporting and scheduling of resources based thereon. In an embodiment, criterion 325 may comprise a confidence level threshold increase period indication indicative of an amount of time during which a number of increases to a confidence level threshold are analyzed with respect to a maximum number criterion indicated in field 325.

In an embodiment, on condition of a proactive scheduling control with device assistance mode being implemented, and based on RAN node 105 receiving an invalid resource scheduling indication 220 from WTRU/device, RAN node 105 may increase a current confidence level threshold corresponding to WTRU/UE 115, by configured step increase value 315, and may configure WTRU/UE 115 to update the confidence level criterion/threshold. On condition of the RAN node configuring a confidence level according to step increase 320 a number of time equal to or more than a configured number of times indicated in field 325, RAN node 105 may transmit and configure WTRU/UE 115 with a proactive scheduling interruption indication 230, indicative to user equipment 115 that the RAN node has interrupted proactive scheduling and prediction report reporting. Thus, according to embodiments disclosed herein, proactive radio resource scheduling may facilitate latency-stringent traffic flows (e.g., stringent joint downlink-uplink multimodal services, for example extended reality services) by using traffic predictions generated by a user equipment while minimizing occurrences of a RAN node being misled by an errant prediction of traffic by a poorly-performing learning mode operating at the user equipment.

Device Downlink Scheduling Validation.

According to conventional techniques, a user equipment attempts decoding of received traffic regardless of whether the decoding is a success or failure (e.g., regardless of whether the traffic, for example a packet, is successfully decoded). Upon successfully decoding a packet, the user equipment may forward the successfully decoded packet to an application layer corresponding to the user equipment. However, upon failure to successfully decode a packet, the user equipment typically requests retransmission of the same payload, for example via a HARQ negative acknowledgement ("NACK").

Instead, according to embodiments disclosed herein, a user equipment may first validate a received and decoded downlink traffic packet corresponding to predicted traffic, (e.g., the user equipment may determine whether the decoded packet will be useful to the application layer or not) and avoid transmitting a HARQ NACK if the packet is deemed invalid. According to embodiments disclosed herein, a user equipment may not transfer received invalid payload to the application layer even if the payload is successfully decoded.

Conventional user equipment reporting behavior typically comprises sending, to a serving RAN node, a decoding state feedback (e.g., a HARQ acknowledgement ("ACK") or NACK status indication) to indicate to the RAN node the actual decoding state (e.g., success or failure) corresponding to received payload or always avoiding sending of HARQ feedback based on direct configurations from serving RAN node. According to embodiments disclosed herein, a user equipment device may implement a novel HARQ reporting behavior by sending a HARQ feedback status indication to a serving RAN node only when valid downlink traffic payload is determined and successfully decoded. For example, when an invalid and successfully decoded payload is received (e.g., the payload is successfully decoded but unused by an application corresponding to a user equipment), unlike with conventional techniques, the user equipment may avoid sending HARQ feedback corresponding to the decoded payload even if the payload is successfully decoded.

In reference to FIG. 2, AI-capable WTRU/UE 115 may receive a proactive radio resource scheduling control configuration 210 from serving RAN node 105. Configuration 210 may comprise the following information elements: a proactive scheduling mode indication (e.g., indication 410 shown in FIG. 4) indicative of proactive scheduling without device assistance or proactive scheduling with device assistance. Indication 410 may be used by a user equipment to determine whether, if invalid proactively-scheduled downlink traffic is detected, to explicitly or implicitly indicate resource scheduling validity state information towards the serving RAN node 105. Transmitting an explicit invalid resource scheduling indication 220 increases consumption of uplink signaling overhead but facilitates a more accurate indication of a traffic payload invalidity state to the RAN node than if a failure-to-receive-HARQ-feedback mode is used to indicate to the RAN node an invalidity state corresponding to the traffic. However, although failure to receive HARQ feedback to indicate an invalidity state of traffic received at a user equipment may result in a reduction of signaling overhead resources used, such a mode tends to reduce accuracy of resource scheduling at the RAN node because failure to receive a HARQ feedback could be the result not only of a traffic packet being deemed invalid but may also be the result of failure of the user equipment to receive the traffic payload or failure to receive a HARQ feedback indication indicative of the traffic payload being valid. Thus, failure to receive, at a RAN node, a HARQ status indication when an implicit mode of providing feedback corresponding to receiving of predicted is implemented may result in the RAN node increasing a confidence level threshold at the user equipment based on a packet not being received at all or based on a HARQ indication, transmitted by the user equipment and indicative of a successfully decoded valid packet, not being received by the RAN node.

WTRU/UE 115 may receive, and decode, a proactive downlink resource grant and/or downlink traffic, which scheduling of resources or transmitting of traffic may have been the result of serving RAN node 105 previously receiving, from UE 115, user behavior reporting (e.g., based on a behavior/traffic prediction report 215). Accordingly, downlink traffic resources to facilitate delivery of predicted downlink traffic may be scheduled, or predicted downlink traffic may be transmitted to UE 115, in response to a predicted WTRU/UE behavior that is yet to occur. WTRU/UE 115 may determine validity of decoded proactive/predicted downlink traffic. For example, user equipment 115 may buffer proactively scheduled predicted downlink traffic received from RAN node 105 until a time at which the predicted device/application behavior is predicted to occur (e.g., a time when predicted UE behavior, or behavior of a user corresponding thereto, that resulted in the prediction of traffic and corresponding scheduling of downlink resources to facilitate delivery of the predicted downlink traffic, is/was predicted to occur). If user equipment 115, or an application corresponding thereto, experiences, causes, or is subjected to different behavior than the behavior that resulted in the prediction of downlink traffic, received and/or decoded downlink traffic may be deemed invalid since the traffic corresponds to a predicted behavior that did not occur (e.g., an AI learning model at the user equipment misestimated or mispredicted the behavior and thus resources scheduled to facilitate delivery of predicted downlink traffic may have also been misestimated or mispredicted).

On condition of a proactive scheduling without device assistance mode being operative and on condition of determining an invalid proactive downlink resource scheduling (e.g., a decoded downlink traffic packet that does not match or relate to actual behavior or traffic predicted in a prediction report 215), WTRU/UE 115 may avoid transmission of a HARQ feedback transmission in the uplink direction, regardless of a downlink decoding state corresponding to the decoded downlink traffic packet. Such a scenario corresponds to UE 115 implicitly indicating to serving RAN node 105 an invalid downlink scheduling by avoiding reporting a decoding state (e.g., avoiding HARQ feedback reporting). However, implicit indication of a validity state corresponding to a packet, or packets, may come at the expense of degraded RAN node 'knowledge' regarding the actual validity/usefulness of downlink grants used to deliver the invalid packets. For example, RAN node 115 may not be able to distinguish between failure of UE 115 to detect a resource grant, or traffic delivered according thereto, and the UE determining that proactively scheduled downlink traffic is invalid. Thus, on condition of activating a proactive scheduling with device assistance mode and on condition of determining an invalid proactive downlink scheduling (e.g., a decoded downlink traffic packet does not match or relate to an uplink control update that corresponds to predicted behavior that is the basis for predicting of the downlink resources), WTRU/UE 115 may transmit, as an uplink control information message, an invalid downlink scheduling indication, which may be referred to as an invalid resource scheduling indication 220, towards the serving RAN node. Transmitting of an invalid resource scheduling indication 220 may represent explicit reporting, by WTRU/UE 115, that indicates to RAN node 105 proactive scheduling validity information. On condition of determining invalid proactively scheduled downlink traffic, WTRU/UE 115 may flush decoded downlink traffic and avoid delivering the decoded downlink traffic to application layer corresponding to the user equipment.

Turning now to FIG. 5, the figure illustrates a timing diagram of an example method 500 to use a learning model at a user equipment to facilitate a radio access network node scheduling downlink traffic predicted by the user equipment. At act 505, RAN node 105 may receive a proactive radio resource scheduling control configuration (e.g., a configuration 205 described in reference to FIG. 2), from core network 130 via backhaul interface links 120. A proactive radio resource scheduling control configuration may comprise a proactive scheduling mode indication in terms of a proactive scheduling without device assistance mode or a proactive scheduling with device assistance mode. A proactive radio resource scheduling control configuration may comprise a step increase value usable to instruct user equipment 115 to increase a confidence level threshold of a learning model that may be executing, at the user equipment, to predict user behavior, to predict user equipment behavior, to predict uplink traffic, or to predict other actions that may be a basis for RAN node 105 scheduling downlink resources usable to transmit to UE 115 predicted downlink traffic corresponding to a prediction facilitated by the learning model. A proactive radio resource scheduling control configuration may comprise a proactive minimum confidence level threshold (e.g., threshold 317 described in reference to FIG. 3), with which RAN node 105 may configure UE 115 to determine whether to generate, or to transmit to RAN node 105, a proactive performance indicator, such as a report 215 described in reference to FIG. 2 that may be used by RAN 105 to predict downlink traffic and to schedule one or more resources corresponding thereto. A proactive radio resource scheduling control configuration may comprise a criterion 325 described in reference to FIG. 3, which may be applicable to a number of times RAN 105 has configured, or instructed, UE 115 to increase a confidence level threshold by step increase value 320. For example, if RAN node 105 has configured, or instructed, UE 115 to increase a learning model confidence level threshold by a configured step increase value more times than indicated by predicted confidence level criterion 325, RAN 105 may instruct UE 115 to deactivate, at least temporarily, generating or transmitting of prediction reports 215. At act 510, RAN node 105 may transmit, via a radio interface link 125, towards WTRU/UE 115, a radio resource scheduling control configuration (e.g., configuration 210 described in reference to FIG. 2), that may comprise a proactive scheduling mode indication.

On condition of receiving a proactive uplink radio performance and/or user behavior report (e.g., a prediction report 215 described in reference to FIG. 2) from WTRU/UE 115, at act 515 RAN 105 may schedule downlink resources to facilitate delivery of downlink traffic, for example downlink traffic corresponding to a multi-modal downlink traffic flow related to uplink traffic that may be predicted by a learning model at UE 115. At act 516, RAN node 105 may indicate, to UE 115, the scheduled resource(s) via a scheduled predicted traffic resource indication 216 described in reference to FIG. 2. The scheduled resources may be scheduled to satisfy a target QoS corresponding to the multi-modal traffic service. At act 517, RAN node 105 may transmit to UE 115 predicted traffic according to the resources scheduled at act 515.

On condition of adopting, and configuring UE to operate according to, a proactive scheduling control without device assistance mode and having failed to receive decoding HARQ feedback corresponding to the transmission of scheduled proactive downlink traffic at act 517, at act 520 RAN node 105 may determine to increase a current confidence level threshold applicable to a confidence level corresponding to a learning model at WTRU/UE 115 by the configured step increase value 320 via configuration 210 transmitted to UE at act 510. In an embodiment, instead of transmitting a confidence level criterion increase to UE 115 via configuration information 210, RAN node 105 may transmit to UE 115 a prediction confidence level criterion indication (e.g., indication 240 described in reference to FIG. 2) to configure WTRU/UE 115 with an updated/increased minimum confidence level criterion/threshold. On condition of RAN node 115 determining a number of confidence level increments/increases equal to or greater than a maximum allowable number of failed proactive downlink scheduling instants (e.g., RAN node 115 has configured UE 115 via a number of indications 240 at act 520 that is equal to or greater than a value 235 received at act 505 in configuration 205) the RAN node may transmit to WTRU/UE a proactive scheduling interruption indication (e.g., indication 230 described in reference to FIG. 2), to be indicative to UE 115 to halt proactive/predictive radio of behavior reporting. After halting of prediction of behavior/traffic based on the determination or transmission of the indication at act 540, delivery of traffic corresponding to traffic flow 232 between UE 115 and RAN 105 may be facilitated according to conventional techniques.

On condition of adopting a proactive scheduling control with device assistance mode (e.g., configuration/indication 210 transmitted at act 510 indication device assistance mode) and on condition of receiving an invalid scheduled traffic indication (e.g., an indication 220) from WTRU/UE, RAN node 105 may determine to increase the current confidence level criterion, corresponding to a learning model at the WTRU/UE, by the configured increase step, and thus may configure WTRU/UE 115 with the updated minimum confidence level threshold. On condition of the RAN node configuring UE 115 with a number of confidence level increments/increases greater than the maximum allowable number, indicated in field 325 of configuration information 205, of failed proactive downlink scheduling instants, RAN node 105 may transmit and configure WTRU/UE 115 with a proactive scheduling interruption indication (e.g., indication 230 described in reference to FIG. 2), to be indicative to UE 115 to halt proactive/predictive radio and behavior reporting. After halting of prediction of behavior/traffic based on the determination or transmission of the indication at act 540, delivery of traffic corresponding to traffic flow 232 between UE 115 and RAN 105 may be facilitated according to conventional techniques.

Turning now to FIG. 6, the figure illustrates a timing diagram of an example method 600 to validate proactive downlink scheduling. At act 605, AI-capable WTRU/UE 115 may receive proactive radio resource scheduling control configuration (e.g., configuration 210), from serving RAN node 105. The configuration received at act 605 may comprise a proactive scheduling mode indication comprising a proactive scheduling without device assistance or a proactive scheduling with device assistance. At act 610, WTRU/

UE may receive from RAN node 105, and decode proactive/predicted downlink traffic, for example traffic 231 shown in FIG. 2. At act 615, WTRU/UE may determine validity of the traffic decoded at act 610. On condition of having been configured at act 605 to operate according to a proactive scheduling without device assistance mode, and on condition of having determining an invalid proactive downlink scheduling, (e.g., downlink traffic decoded at act 610 does not match or relate to predicted behavior or uplink traffic that may have been indicated in a report 215 described in reference to FIG. 2), WTRU/UE may avoid transmission to RAN node 105 of one or more HARQ feedback status indication(s) corresponding to traffic decoded at act 610.

On condition of being configured to operate according to a proactive scheduling with device assistance mode and on condition of determining an invalid proactive downlink scheduling, at act 625 WTRU/UE 115 may transmit to RAN node 105, as an uplink control information message, an invalid downlink scheduling indication (e.g., indication 220) towards the serving RAN node. On condition of determining invalid downlink traffic, at act 630 WTRU/UE 115 may flush decoded downlink traffic and avoid delivering the invalid traffic to an application layer corresponding to the user equipment.

Figure 7:
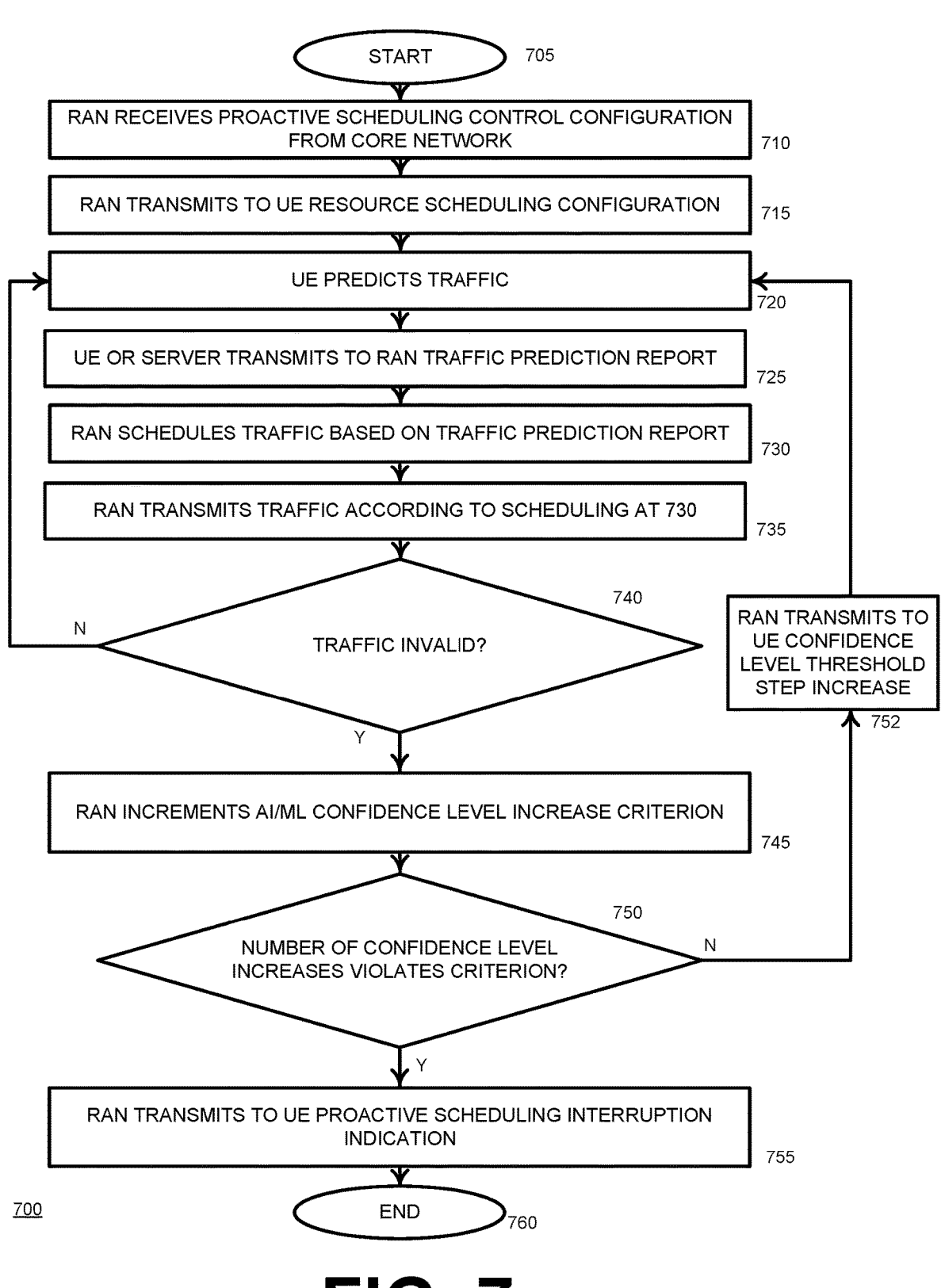
FIG. 7 illustrates a flow diagram of an example method to use a learning model at a user equipment to facilitate scheduling downlink traffic.

Turning now to FIG. 7, the figure illustrates a flow diagram of an example method 700 to use a learning model at a user equipment to facilitate scheduling resources that are usable to deliver downlink traffic. Method 700 begins at act 705. At act 710, a radio access network node may receive from equipment of a communication network, for example core network 130 shown in FIG. 1, proactive scheduling control configuration information, for example configuration information 205 described in reference to FIG. 2. At act 715, the radio access network node may transmit, to a user equipment, resource scheduling configuration information in a message, for example configuration information 210 in message 400 described in reference to FIGS. 2 and 4. As described in reference to FIG. 2, configuration information 210 may comprise a similar mode indication as may be included in configuration 205. The mode indication may be indicative to a user equipment, to which configuration 210 is transmitted at act 715, to affirmatively transmit to radio access network node an invalid resource scheduling indication, for example indication 220 described in reference to FIG. 2, upon receiving and successfully decoding a traffic packet that is unused by, or unusable by, an application executing on the user equipment. As an example, the radio access network node may be facilitating a multimodal traffic session wherein downlink traffic tends to be related to uplink traffic insofar as action of a user, a user equipment, or an application at the user equipment, may typically result in downlink traffic being received at the radio access network node for delivery to the user equipment in response to the uplink traffic. Thus, the radio access network node may receive a learning-model-based prediction (predicted at the user equipment) of traffic or a prediction of action by the user equipment, a user of the user equipment, or an application at the user equipment, and based on the prediction, the radio access network node may schedule downlink resources to facilitate delivery to the user equipment of downlink traffic concomitant to the predicted traffic or action.

At act 720, the user equipment may use a learning model to predict action or uplink traffic corresponding thereto. At act 725, the user equipment may transmit to the radio access network node a behavior/action/traffic prediction report, for example, traffic prediction report 215 described in reference to FIG. 2. In an embodiment, a network server communicatively coupled with the radio access network node, for example an extended reality services server, may transmit a prediction report to the radio access network node. At act 730, responsive to the prediction report, the radio access network node may schedule downlink resources, or down-link traffic according to the scheduled downlink resources, wherein the radio access network node schedules downlink resources based on information contained in the prediction report transmitted at act 725. At act 735, the radio access network node may transmit downlink traffic corresponding to, related to, or concomitant to prediction information contained in prediction report 215. The radio access network node may use the downlink resources scheduled at act 730 to transmit the downlink traffic at act 735.

At act 740, the radio access network node may determine whether traffic transmitted at act 735 is invalid traffic (e.g., traffic that may be successfully received and decoded by the user equipment but may be nevertheless unused/unusable by the user equipment because action or uplink traffic predicted at act 720 and indicated by the prediction report transmitted at act 725 did not actually occur). The radio access network node may determine the invalidity of traffic transmitted at act 735 by failure to receive from the user equipment, within a configured period, a status indication corresponding to the traffic (e.g., the radio access network node fails to receive a HARQ ACK or NACK corresponding to the traffic trans-mitted at act 735). The radio access network node may also determine the invalidity of traffic transmitted at act 735 by receiving, from the user equipment, an invalid resource scheduling indication. The user equipment may affirma-tively transmit an invalid resource scheduling indication based on a mode, indicated by configuration information 210, that configures the user equipment to assist determina-tion of invalid traffic by transmitting the invalid resource scheduling indication.

If a determination is made at act 740 that traffic transmit-ted at act 735 is not invalid, method 700 may return to act 720 and continue as previously described. If a determination is made at act 740 that traffic transmitted at act 735 is invalid, method 700 may advance to act 745. At act 745, the radio access network node may increase a machine learning model confidence level criterion, for example a confidence level threshold, to be used by the user equipment to deter-mine whether to transmit a prediction report, such as traffic prediction report transmitted at act 725. The radio access network node may increase the confidence criterion at act 745 according to a step increase value indicated in the configuration that may have been received from the core network at act 710.

At act 750, the radio access network node may determine whether an increased confidence level threshold that may result from an increase in learning model confidence thresh-old criterion index 745 exceeds an adjustment criterion received in the configuration at act 710. For example, the adjustment criterion may comprise a maximum number of times that the radio access network node has increased a machine learning model confidence level threshold at act 745. If the radio access network node has not increased the machine learning model confidence level threshold/criterion a number of times equal to or greater than the adjustment criterion, method 700 may advance to act 752. At act 752, the radio access network node may transmit to the user equipment an indication to increase the learning model confidence level threshold/criterion by a confidence level step increase amount. The confidence level threshold step increase amount may be transmitted via a prediction confi-dence level indication 240 described in reference to FIG. 2.

The confidence level threshold step increase amount may be a value indicated to the radio access network node in configuration 205 received by the radio access network node at act 710. The user equipment may receive the indication of an increase in prediction confidence level threshold trans-mitted by the radio access network node at act 752 and may continue predicting action (e.g., extended reality user behav-ior or XR application behavior), or uplink traffic correspond-ing thereto, using a learning model associated with the confidence level that may be analyzed with respect to an increased confidence level threshold that results from increasing a previous confidence level threshold by the confidence level threshold step increase transmitted by the radio access network node at act 752. Accordingly, the higher the confidence level threshold value the higher the accuracy of a prediction received from the user equipment in a prediction report is likely to be, and the less likely that resources scheduled by the RAN node to facilitate downlink traffic corresponding to the prediction will be wasted deliv-ering invalid traffic.

Returning to description of act 750, if a determination is made by the radio access network node that a machine learning model confidence criterion/threshold has been increased at 745 a number of times equal to or more than a configured adjustment criterion, for example a value con-tained in field 325 of configuration 205 shown in FIG. 3, method 700 may advance to act 755. At act 755, the radio access network node may transmit to the user equipment a proactive scheduling interruption indication, for example an interruption indication 230 described in reference to FIG. 2, which may be indicative to the user equipment that the radio access network node is deactivating, at least temporarily, proactive scheduling of downlink resources based on traffic prediction reports and may instead transmit downlink traffic based on conventional request and grant techniques or based on conventional configured grant techniques. After trans-mitting an interruption indication at act 755, method 700 may advance to act 760 and ends.

By interrupting/deactivating proactive scheduling of downlink resources, based on a determination that predic-tions of uplink traffic have previously resulted in scheduling downlink resources for delivery of invalid traffic, scheduling of resources to transmit unused/invalid traffic may be mini-mized. For example, if a confidence level threshold/criterion to be used by a learning model at the user equipment to determine whether to transmit a prediction report has been increased at act 745 more times that a configured value indicated in field 325 of configuration 205, resources used to continue to transmit, by the user equipment, invalid resource scheduling indications to indicate invalid packets may negate a reduction in overhead resources that may result from proactive scheduling of downlink resources based on a prediction made by the learning model. Thus, if after increasing a confidence level threshold a configured maxi-mum number of times the learning model is performing poorly to the extent that the model is still predicting action or traffic that results in invalid traffic, beneficial reduction in use of overhead resources that may result from proactively scheduling downlink traffic resources and transmitting pre-dicted downlink traffic based on predicted action, or pre-dicted uplink traffic based thereon, at the user equipment that ultimately does not occur may be outweighed by the detri-mental waste of proactively scheduled downlink resources that are used to transmit invalid traffic. Accordingly, if a confidence level threshold, satisfaction of which may trigger transmitting of a prediction report from a user equipment, corresponding to a learning model has been increased more than a configured number of times, the radio access network node may deem the learning model as 'poorly performing' and may interrupt, or halt, proactively scheduling downlink resources based on prediction report received from the user equipment.

Figure 8:
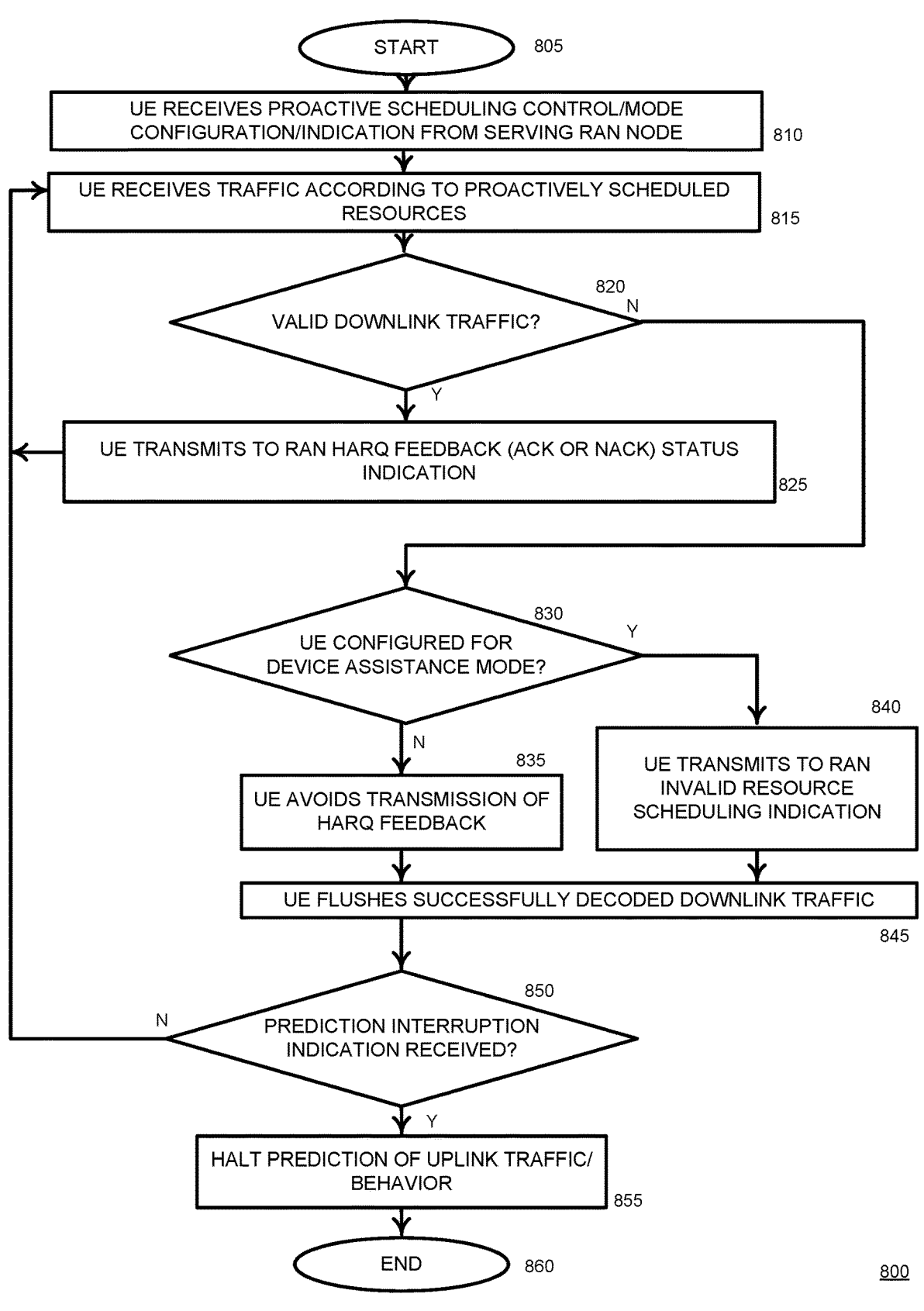
FIG. 8 illustrates a flow diagram of an example method to use a learning model at a user equipment to facilitate validating proactive scheduling of traffic predicted by a learning model at the user equipment.

Turning now to FIG. 8, the figure illustrates a flow diagram of an example method 800 to use a learning model at a user equipment to facilitate validating proactive scheduling of traffic predicted by a learning model at the user equipment. Method 800 begins at act 805. At act 810, a user equipment may receive a proactive scheduling/control configuration/indication from a serving radio access network node, such as configuration 210 described in reference to FIG. 2. Responsive to previously predicted uplink behavior/traffic reported to the radio access network node (e.g., via prediction report 215 described in reference to FIG. 2), at act 815 the user equipment may receive and attempt to decode downlink traffic corresponding to the predicted uplink behavior/traffic. At act 820, the user equipment may determine whether traffic received at act 815 is invalid. If a determination is made at act 820 that traffic received at act 815 is not invalid, at act 825 the user equipment may transmit to the serving radio access network node a HARQ status indication indicative of successful decoding of the traffic received at act 815 and also indicative that the traffic received at act 815 is valid traffic that is usable by the user equipment, or an application executing thereon. After transmitting a HARQ status indication to the radio access network node at act 825, method 800 may return to act 815.

Returning to description of act 820, if the user equipment determines that traffic received at act 815 is invalid, at act 830 the user equipment may determine a mode, configured via configuration information received at act 810, to use to indicate invalid traffic received and decoded at 815, wherein validity of a packet, or packets, may be based on whether the packet, or packets, are used, or usable, by an application executing on the user equipment. The user equipment may determine that traffic is invalid by determining whether predicted/expected user behavior action at the user equipment, or uplink traffic generated based on predicted user behavior or application action, indicated in a prediction report transmitted to the RAN node and received thereby at act 810, actually occurred. If a determination is made at act 830 that a mode to indicate invalid traffic does not require device assistance, at act 835 the user equipment may avoid transmitting to the radio access network node serving the user equipment a HARQ feedback status indication corresponding to the invalid downlink traffic. Method 800 may advance to act 845 and the user equipment may flush successfully decoded invalid traffic.

Returning to description of act 830, if a determination is made that a mode to indicate invalid traffic requires device assistance, at act 840 the user equipment may transmit to the serving RAN node an invalid resource scheduling indication, such as indication 220 described in reference to FIG. 2, that affirmatively indicates to the RAN node that the traffic transmitted according to predicted resources is invalid. At act 840, the user equipment may also transmit to the radio access network node serving the user equipment a HARQ feedback status indication corresponding to the invalid downlink traffic. In an embodiment, at act 840 the user equipment may avoid transmission of HARQ feedback. Method 800 may advance to act 845 and the user equipment may flush successfully decoded invalid traffic.

After flushing successfully decoded invalid traffic at act 845, at act 850, the user equipment may determine whether a proactive resource scheduling interruption indication, such as indication 230 described in reference to FIG. 2, has been received by the user equipment. If a determination is made at act 850 that a proactive resource scheduling interruption indication has not been received, method 800 may return to act 815 and the user equipment may continue to receive predicted traffic according to proactively scheduled downlink resources. If a determination is made at act 850 that a proactive resource scheduling interruption indication has been received, the user equipment may halt the predicting of behavior/uplink traffic using a learning model, and method 800 may advance to act 860 and end.

Turning now to FIG. 9, the figure illustrates an example embodiment method 900 comprising at block 905 transmitting, by a user equipment comprising at least one processor to a radio network node, a traffic prediction report comprising at least one traffic prediction indication indicative of predicted traffic corresponding to at least one traffic flow facilitated by the user equipment; at block 910 receiving, by the user equipment from the radio network node, a scheduled predicted traffic resource indication indicative of at least one scheduled predicted traffic resource usable by the user equipment to facilitate delivery of the predicted traffic; at block 915 receiving, from the radio network node, the predicted traffic corresponding to the at least one traffic flow according to the at least one scheduled predicted traffic resource to result in received predicted traffic; at block 920 determining, by the user equipment, that the received predicted traffic is unusable by the user equipment to result in determined unusable received predicted traffic; at block 925 avoiding, by the user equipment, transmitting, to the radio network node, a status indication indicative of decoding of the determined unusable received predicted traffic; and at block 930 flushing, by the user equipment, the determined unusable received predicted traffic.

Turning now to FIG. 10, the figure illustrates a user equipment 1000, comprising at block 1005 at least one processor configured to process executable instructions that, when executed by the processor, facilitate performance of operations, comprising predicting, using a learning model, downlink traffic corresponding to at least one traffic flow to result in predicted downlink traffic; at block 1010 transmitting, to a radio network node, at least one predicted downlink traffic indication indicative of the predicted downlink traffic; at block 1015 receiving, from the radio network node, a scheduled predicted downlink traffic resource indication indicative of at least one scheduled predicted downlink traffic resource usable by the user equipment to facilitate delivery of the predicted downlink traffic; at block 1020 receiving, from the radio network node, the predicted downlink traffic according to the at least one scheduled predicted downlink traffic resource to result in received predicted downlink traffic; at block 1025 receiving, from the radio network node, a proactive scheduling control configuration comprising a proactive scheduling mode indication indicative to the user equipment to transmit, to the radio network node, an invalid resource scheduling indication indicative of nonuse, by the user equipment, of predicted downlink traffic; at block 1030 determining that the received predicted downlink traffic is not usable by the user equipment to result in determined unusable received predicted downlink traffic; and at block 1035 transmitting, to the radio network node, an invalid resource scheduling indication indicative that the determined unusable received predicted downlink traffic is not usable by the user equipment.

Turning now to FIG. 11, the figure illustrates a non-transitory machine-readable medium 1100 comprising at block 1105 executable instructions that, when executed by at least one processor of a user equipment, facilitate performance of operations, comprising predicting, using a learning model, downlink traffic corresponding to at least one traffic flow to result in predicted downlink traffic; at block 1110 transmitting, to a radio network node, at least one downlink traffic prediction indication indicative of the predicted downlink traffic; at block 1115 responsive to the transmitting of the at least one downlink traffic prediction indication, receiving, from the radio network node, a scheduled predicted downlink traffic resource indication indicative of at least one scheduled predicted downlink traffic resource usable by the user equipment to facilitate delivery of the predicted downlink traffic; at block 1120 receiving, from the radio network node, the predicted downlink traffic according to the at least one scheduled predicted downlink traffic resource to result in received predicted downlink traffic; at block 1125 determining that the received predicted downlink traffic is unusable by the user equipment to result in determined unusable received predicted downlink traffic; at block 1130 avoiding, by the user equipment, transmitting, to the radio network node, a status indication indicative of decoding of the determined unusable received predicted downlink traffic, and at block 1135 avoiding delivery of the determined unusable received predicted traffic to an application, execution of which is being facilitated by the processor.

Figure 12:
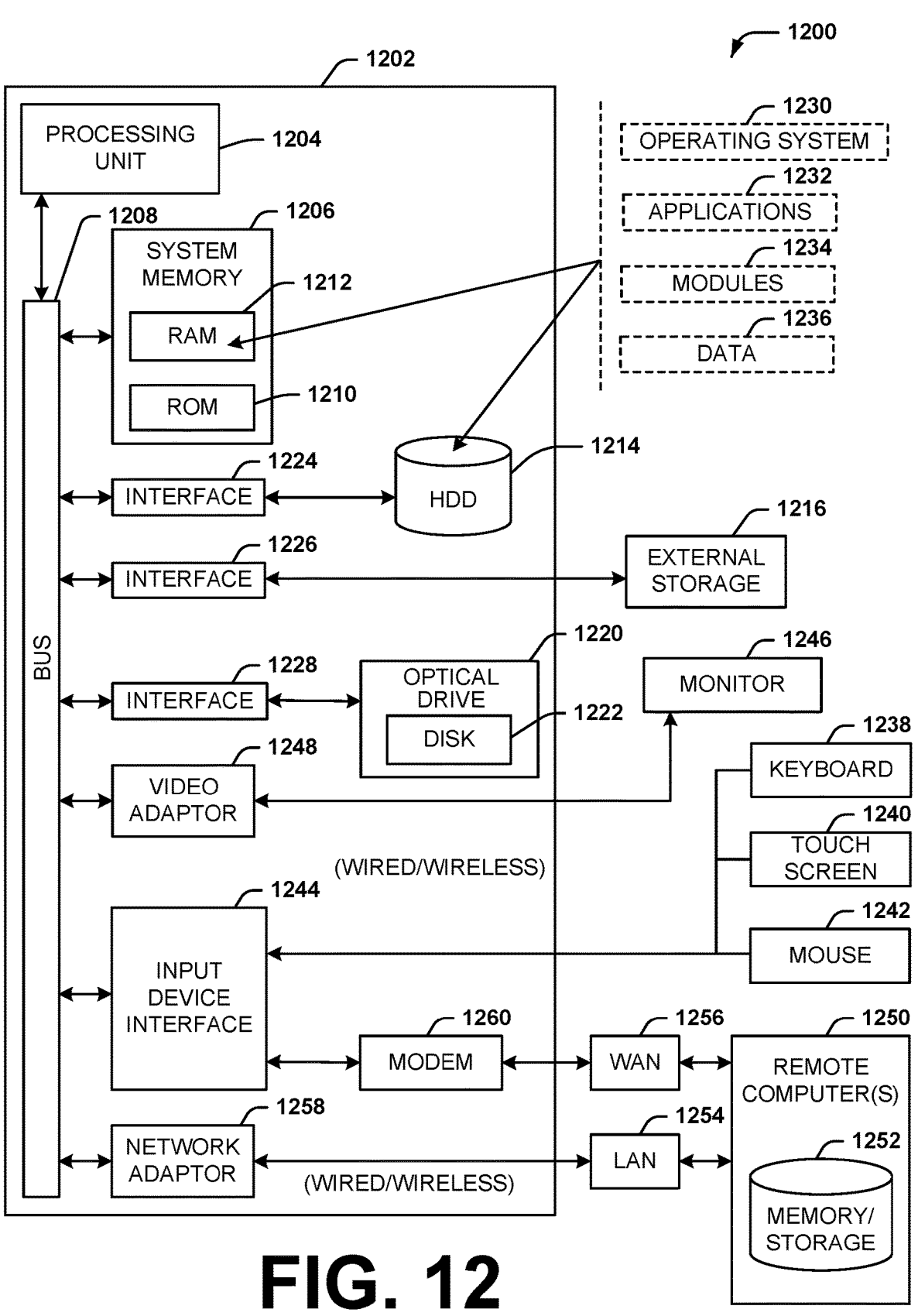
FIG. 12 illustrates an example computer environment.

In order to provide additional context for various embodiments described herein, FIG. 12 and the following discussion are intended to provide a brief, general description of a suitable computing environment 1200 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

Computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
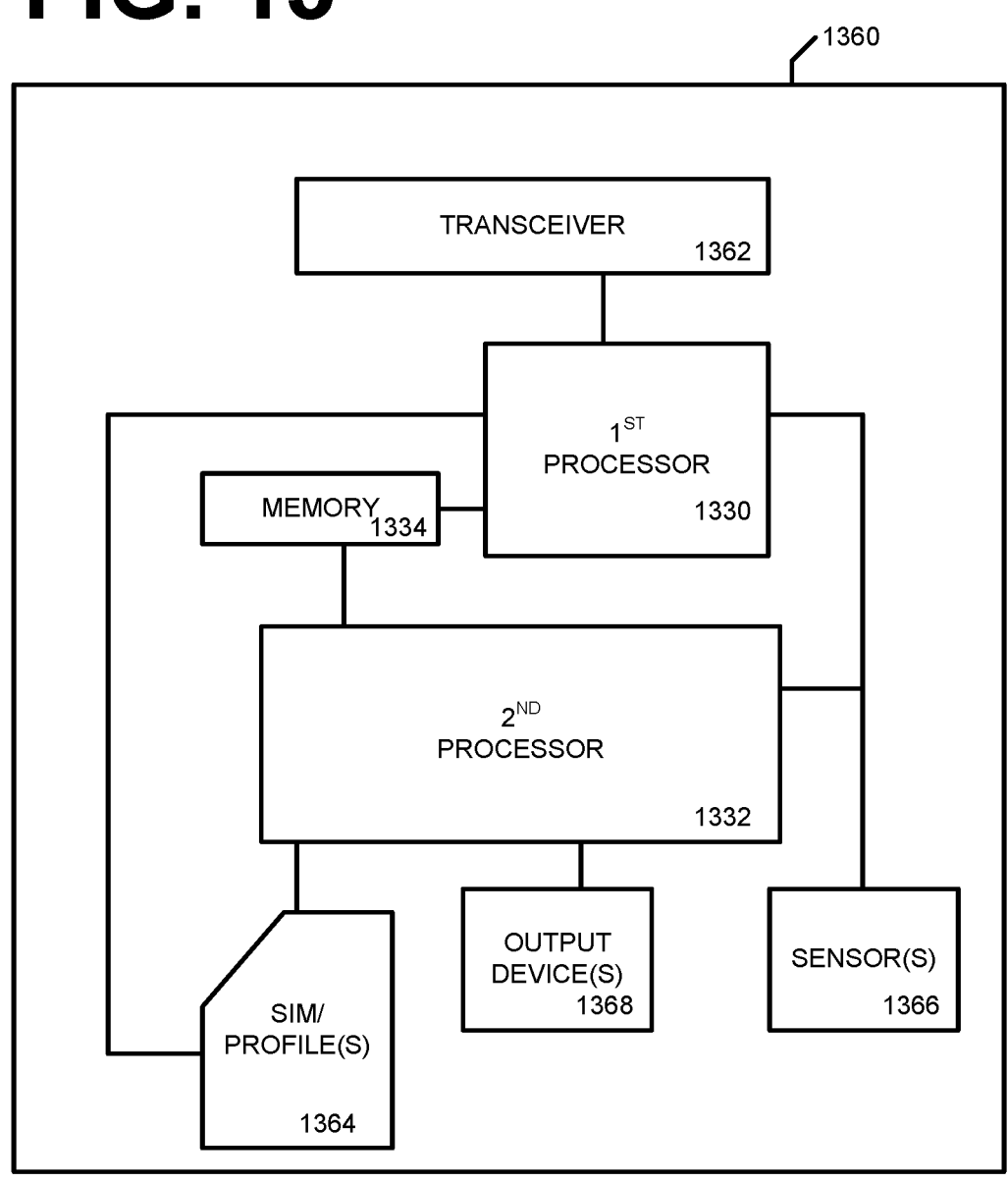
FIG. 13 illustrates a block diagram of an example wireless UE.

Turning to FIG. 13, the figure illustrates a block diagram of an example UE 1360. UE 1360 may comprise a smart phone, a wireless tablet, a laptop computer with wireless capability, a wearable device, a machine device that may facilitate vehicle telematics, a tracking device, remote sensing devices, and the like. UE 1360 comprises a first processor 1330, a second processor 1332, and a shared memory 1334. UE 1360 includes radio front end circuitry 1362, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1362 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 13, UE 1360 may also include a SIM 1364, or a SIM profile, which may comprise information stored in a memory (memory 1334 or a separate memory portion), for facilitating wireless communication with RAN 105 or core network 130 shown in FIG. 1. FIG. 13 shows SIM 1364 as a single component in the shape of a conventional SIM card, but it will be appreciated that SIM 1364 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1364 and another device, which may be a component of RAN 105 or core network 130 shown in FIG. 1). A SIM profile 1364 may also comprise identifying information that is unique to the SIM, or SIM profile, such as, for example, an International Mobile Subscriber Identity ("IMSI") or information that may make up an IMSI.

SIM 1364 is shown coupled to both the first processor portion 1330 and the second processor portion 1332. Such an implementation may provide an advantage that first processor portion 1330 may not need to request or receive information or data from SIM 1364 that second processor 1332 may request, thus eliminating the use of the first processor acting as a 'go-between' when the second processor uses information from the SIM in performing its functions and in executing applications. First processor 1330, which may be a modem processor or a baseband processor, is shown smaller than processor 1332, which may be a more sophisticated application processor, to visually indicate the relative levels of sophistication (i.e., processing capability and performance) and corresponding relative levels of operating power consumption levels between the two processor portions. Keeping the second processor portion 1332 asleep/inactive/in a low power state when UE 1360 does not need it for executing applications and processing data related to an application provides an advantage of reducing power consumption when the UE only needs to use the first processor portion 1330 while in listening mode for monitoring routine configured bearer management and mobility management/maintenance procedures, or for monitoring search spaces that the UE has been configured to monitor while the second processor portion remains inactive/asleep.

UE 1360 may also include sensors 1366, such as, for example, temperature sensors, accelerometers, gyroscopes, barometers, moisture sensors, and the like that may provide signals to the first processor 1330 or second processor 1332. Output devices 1368 may comprise, for example, one or more visual displays (e.g., computer monitors, VR appliances, and the like), acoustic transducers, such as speakers or microphones, vibration components, and the like. Output devices 1368 may comprise software that interfaces with output devices, for example, visual displays, speakers, microphones, touch sensation devices, smell or taste devices, and the like, that are external to UL 1360.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |

TABLE 1-continued

| Term | Definition |
| --- | --- |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by at least one user equipment comprising at least one processor from a radio network node, at least one prediction confidence level criterion indication, indicative of at least one prediction confidence level criterion increase, usable by the at least one user equipment to facilitate prediction of traffic corresponding to at least one traffic flow;

updating a prediction confidence level criterion according to the at least one prediction confidence level criterion increase to result in an updated prediction confidence level criterion;

transmitting, by the at least one user equipment to the radio network node, a traffic prediction report comprising at least one traffic prediction indication indicative of first predicted traffic corresponding to the at least one traffic flow facilitated by the user equipment;

receiving, by the at least one user equipment from the radio network node, a scheduled predicted traffic resource indication indicative of at least one scheduled predicted traffic resource usable by the at least one user equipment to facilitate delivery of the first predicted traffic;

receiving, by the at least one user equipment from the radio network node, the first predicted traffic corresponding to the at least one traffic flow according to the at least one scheduled predicted traffic resource to result in received first predicted traffic;

predicting, by the at least one user equipment using a learning model, second predicted traffic corresponding to the at least one traffic flow to result in a traffic prediction and a prediction confidence level corresponding to the traffic prediction;

determining that the prediction confidence level satisfies the updated prediction confidence level criterion;

based on the prediction confidence level being determined to satisfy the updated prediction confidence level criterion, transmitting, by the at least one user equipment to the radio network node, a predicted traffic indication, indicative of the traffic prediction, usable by the radio network node to schedule at least one updated scheduled predicted traffic resource usable by the at least one user equipment to facilitate delivery of the second predicted traffic; and receiving, by the at least one user equipment, the second predicted traffic according to the at least one updated scheduled predicted traffic resource.

2. The method of claim 1, wherein the learning model is configured to be executed by the at least one user equipment to facilitate predicting the predicted traffic.

3. The method of claim 1, further comprising:

determining, by the at least one user equipment, that the received first predicted traffic is unusable by the user equipment to result in determined unusable received predicted traffic; and avoiding, by the at least one user equipment, transmitting, to the radio network node, a status indication indicative of decoding of the determined unusable received predicted traffic.

4. The method of claim 3, further comprising:

flushing, by the at least one user equipment, the determined unusable received predicted traffic.

5. The method of claim 3, wherein the status indication that the at least one user equipment avoids transmitting is one of: an acknowledgement (ACK) or a negative acknowledgement (NACK).

6. The method of claim 1, further comprising:

receiving, by the at least one user equipment from the radio network node, a proactive scheduling control configuration comprising a proactive scheduling mode indication indicative to the at least one user equipment to transmit, to the radio network node, an invalid resource scheduling indication indicative of nonuse, by the at least one user equipment, of predicted traffic;

determining, by the at least one user equipment, that the received predicted traffic is unusable by the at least one user equipment to result in determined unusable received predicted traffic; and transmitting, by the at least one user equipment to the radio network node, an invalid resource scheduling indication indicative that the determined unusable received predicted traffic is unusable by the at least one user equipment.

7. The method of claim 6, further comprising:

flushing, by the at least one user equipment, the determined unusable received predicted traffic.

8. The method of claim 1, further comprising:

receiving, by the at least one user equipment from the radio network node, a proactive scheduling interruption indication indicative to the at least one user equipment to discontinue traffic prediction reporting corresponding to the at least one traffic flow.

9. The method of claim 8, further comprising:

facilitating, by the at least one user equipment, delivery of the at least one traffic flow according to at least one of: requesting, by the at least one user equipment from the radio network node, scheduling of resources to facilitate delivery of traffic, corresponding to the at least one traffic flow, that has been generated; or at least one configured resource occasion.

10. A user equipment, comprising:

at least one processor configured to process executable instructions that, when executed by the processor, facilitate performance of operations, comprising:

predicting, using a learning model, downlink traffic corresponding to at least one traffic flow to result in first predicted downlink traffic;

transmitting, to a radio network node, at least one first predicted downlink traffic indication indicative of the first predicted downlink traffic;

receiving, from the radio network node, a scheduled predicted downlink traffic resource indication indicative of at least one scheduled predicted downlink traffic resource usable by the user equipment to facilitate delivery of the first predicted downlink traffic;

receiving, from the radio network node, the first predicted downlink traffic according to the at least one scheduled predicted downlink traffic resource to result in received predicted downlink traffic;

receiving, from the radio network node, a prediction confidence level criterion increase indication, indicative of a prediction confidence level criterion increase, applicable to a prediction confidence level criterion usable by the user equipment to facilitate delivery of a second predicted downlink traffic indication;

increasing the prediction confidence level criterion according to the prediction confidence level criterion increase to result in an increased prediction confidence level criterion;

predicting, using the learning model, second predicted downlink traffic corresponding to the at least one traffic flow to result in the second predicted downlink traffic indication and a prediction confidence level corresponding to the second predicted downlink traffic indication;

determining that the prediction confidence level satisfies the increased prediction confidence level criterion;

based on the prediction confidence level satisfying the increased prediction confidence level criterion, transmitting, to the radio network node, the second predicted downlink traffic indication, usable by the radio network node to schedule at least one updated scheduled predicted downlink traffic resource usable by the user equipment to facilitate delivery of the second predicted downlink traffic; and receiving, by the user equipment, the second predicted downlink traffic according to the at least one updated scheduled predicted traffic downlink traffic resource.

11. The user equipment of claim 10, wherein the operations further comprise:

determining, by the user equipment, that the received first predicted downlink traffic is not usable by the user equipment to result in determined unusable received predicted downlink traffic; and avoiding, by the user equipment, transmitting, to the radio network node, a status indication indicative of decoding of the determined unusable received predicted downlink traffic.

12. The user equipment of claim 10, wherein the operations further comprise:

receiving, from the radio network node, a proactive scheduling control configuration comprising a proactive scheduling mode indication indicative to the user equipment to transmit, to the radio network node, an invalid resource scheduling indication indicative of nonuse, by the user equipment, of predicted downlink traffic;

determining that the received first predicted downlink traffic is not usable by the user equipment to result in determined unusable received predicted downlink traffic; and transmitting, to the radio network node, an invalid resource scheduling indication indicative that the determined unusable received predicted downlink traffic is not usable by the user equipment.

13. The user equipment of claim 10, wherein the operations further comprise:

based on a determination by the radio network node that an increased prediction confidence level criterion corresponds to violation of a predicted confidence level criterion increase criterion, receiving, from the radio network node, a proactive scheduling interruption indication indicative to the user equipment to discontinue traffic prediction reporting corresponding to the at least one traffic flow; and initiating delivery of the at least one traffic flow according to at least one of: requesting, from the radio network node, scheduling of resources to facilitate delivery of downlink traffic; or at least one configured resource occasion.

14. A non-transitory machine-readable medium, comprising executable instructions that, when executed by a processor of a user equipment, facilitate performance of operations, comprising:

predicting, using a learning model, downlink traffic corresponding to at least one traffic flow to result in first predicted downlink traffic;

transmitting, to a radio network node, a first downlink traffic prediction indication indicative of the first predicted downlink traffic;

responsive to the transmitting of the first downlink traffic prediction indication, receiving, from the radio network node, a scheduled predicted downlink traffic resource indication indicative of at least one first scheduled predicted downlink traffic resource usable by the user equipment to facilitate delivery of the first predicted downlink traffic;

receiving, from the radio network node, the first predicted downlink traffic according to the at least one first scheduled predicted downlink traffic resource to result in received predicted downlink traffic;

receiving, from the radio network node, a prediction confidence level criterion indication, indicative of a prediction confidence level criterion increase, usable by the user equipment to facilitate increasing a prediction confidence level criterion;

updating the prediction confidence level criterion according to the prediction confidence level increase to result in an increased prediction confidence level criterion;

predicting, using the learning model, second downlink traffic corresponding to the at least one traffic flow to result in second predicted downlink traffic;

transmitting, to the radio network node, a second downlink traffic prediction indication indicative of the second predicted downlink traffic, usable by the radio network node to schedule at least one second scheduled predicted downlink traffic resource usable by the user equipment to facilitate delivery of the second predicted downlink traffic; and receiving, by the user equipment, the second predicted downlink traffic according to the at least one second scheduled predicted downlink traffic resource.

15. The non-transitory machine-readable medium of claim 14, wherein the operations further comprise:

determining that the first predicted downlink traffic is unusable by the user equipment to result in determined unusable received predicted downlink traffic; and avoiding, by the user equipment, transmitting, to the radio network node, a status indication indicative of decoding of the determined unusable received predicted downlink traffic.

16. The non-transitory machine-readable medium of claim 15, wherein the operations further comprise:

flushing, by the user equipment, the determined unusable received predicted downlink traffic.

17. The non-transitory machine-readable medium of claim 15, wherein the operations further comprise:

avoiding delivery of the determined unusable received predicted traffic to an application, execution of which is being facilitated by the processor.

18. The method of claim 8, wherein the at least one prediction confidence level criterion indication corresponds to violation of at least one confidence level increase number criterion.

19. The user equipment of claim 13, wherein the proactive scheduling interruption indication is further indicative to the user equipment that the radio access network node is deactivating proactive scheduling of downlink resources based on traffic prediction reports.

20. The user equipment of claim 19, wherein the proactive scheduling interruption indication is further indicative that the deactivating of proactive scheduling of downlink resources is temporary.

* * * * *